US011873442B2

(12) United States Patent
Emerstorfer et al.

(10) Patent No.: US 11,873,442 B2
(45) Date of Patent: *Jan. 16, 2024

(54) USE OF A PROCESS FLUID WITH AN ENVIRONMENTALLY COMPATIBLE BIOSTABILIZER IN A GEOTHERMAL BOREHOLE

(71) Applicant: AGRANA BETEILIGUNGS-AKTIENGESELLSCHAFT, Vienna (AT)

(72) Inventors: Florian Emerstorfer, Vienna (AT); Markus Omann, Vienna (AT); Johann Marihart, Limberg (AT); Marnik Michel Wastyn, Schwechat (AT)

(73) Assignee: AGRANA BETEILIGUNGS-AKTIENGESELLSCHAFT, Vienna (AT)

( * ) Notice: Subject to any disclaimer, the term of this patent is extended or adjusted under 35 U.S.C. 154(b) by 0 days.

This patent is subject to a terminal disclaimer.

(21) Appl. No.: 16/062,510

(22) PCT Filed: Dec. 23, 2016

(86) PCT No.: PCT/EP2016/082552
§ 371 (c)(1),
(2) Date: Jun. 14, 2018

(87) PCT Pub. No.: WO2017/109168
PCT Pub. Date: Jun. 29, 2017

(65) Prior Publication Data
US 2018/0371307 A1 Dec. 27, 2018

(30) Foreign Application Priority Data
Dec. 23, 2015 (EP) .................................. 15202340

(51) Int. Cl.
| | |
|---|---|
| *C09K 8/035* | (2006.01) |
| *C09K 8/60* | (2006.01) |
| *A01N 35/06* | (2006.01) |
| *A01N 65/08* | (2009.01) |
| *F24T 10/20* | (2018.01) |

(52) U.S. Cl.
CPC .............. *C09K 8/035* (2013.01); *A01N 35/06* (2013.01); *A01N 65/08* (2013.01); *C09K 8/605* (2013.01); *F24T 10/20* (2018.05); *Y02E 10/10* (2013.01)

(58) Field of Classification Search
CPC ......... E21B 43/33; C09K 8/035; C09K 8/605; F24T 10/20; A01N 35/06; A01N 65/08; Y02E 10/14
See application file for complete search history.

(56) References Cited

U.S. PATENT DOCUMENTS

| | | | | |
|---|---|---|---|---|
| 3,047,493 A | * | 7/1962 | Rosenberg | C09K 8/206 507/107 |
| 4,064,056 A | * | 12/1977 | Walker | C09K 8/22 507/109 |
| 4,169,798 A | | 10/1979 | DeMartino | |
| 4,233,162 A | * | 11/1980 | Carney | C09K 8/22 507/108 |
| 4,659,811 A | | 4/1987 | Wu | |
| 4,964,604 A | | 10/1990 | Lombard | |
| 5,096,617 A | * | 3/1992 | Ball | B01D 19/0404 516/116 |
| 5,576,271 A | * | 11/1996 | Patel | C09K 8/16 507/140 |
| 5,681,796 A | | 10/1997 | Nimerick | |
| 5,979,556 A | | 11/1999 | Gallup et al. | |
| 6,810,959 B1 | | 11/2004 | Qu et al. | |
| 2003/0015480 A1 | | 1/2003 | Breen et al. | |
| 2011/0223125 A1 | * | 9/2011 | Hough | A61K 8/8152 424/70.12 |
| 2014/0128295 A1 | * | 5/2014 | Wagles | C09K 8/08 507/111 |
| 2015/0072901 A1 | * | 3/2015 | Samuel | C09K 8/08 507/104 |
| 2015/0191641 A1 | * | 7/2015 | Mazard | C09K 8/32 175/65 |

(Continued)

FOREIGN PATENT DOCUMENTS

| | | | | |
|---|---|---|---|---|
| CN | 103923625 A | | 7/2014 | |
| GB | 1417237 A | | 12/1975 | |
| GB | 2512759 A | * | 10/2014 | ........... E21B 21/065 |

(Continued)

OTHER PUBLICATIONS

International Bureau of WIPO, International Preliminary Report on Patentability Issued in Application No. PCT/EP2016/082552, dated Apr. 3, 2018, WIPO, 5 pages.
Rubin, B. et al., "Immunization of Plants," Biochemistry and Physiology of Plant Immunity, Dec. 30, 1965, 6 pages. (Submitted with Partial Translation).
Shi, M. et al., "Antimicrobial surfactants (II)," China Surfactant Detergent and Cosmetics, vol. 3, Jun. 20, 1995, 15 pages.
Lu, Y., "Development of geothermal resources and research on deep drilling technology," Research and Practice of Drilling Technology, Apr. 30, 2008, 10 pages. (Submitted with Partial Translation).

(Continued)

*Primary Examiner* — Silvana C Runyan
(74) *Attorney, Agent, or Firm* — McCoy Russell LLP

(57) ABSTRACT

The present invention relates to the use of a process fluid with an environmentally compatible biostabilizer in a geothermal borehole. The biostabilizer is characterized in that it comprises at least one organic acid, or a salt, alcohol or aldehyde thereof, wherein the at least one organic acid is selected from the group consisting of hop acids, resin acids, fatty acids and mixtures thereof. The biostabilizer is preferably a mixture of hop extract, rosin and myristic acid. The invention further relates to related process fluids and methods for producing the same.

21 Claims, 12 Drawing Sheets

(56) References Cited

U.S. PATENT DOCUMENTS

| | | | |
|---|---|---|---|
| 2015/0344767 A1* | 12/2015 | Lei | C08B 11/20 |
| | | | 507/224 |
| 2015/0353806 A1* | 12/2015 | Delorme | C09K 8/12 |
| | | | 507/136 |

FOREIGN PATENT DOCUMENTS

| | | | |
|---|---|---|---|
| JP | 2000282020 A | | 10/2000 |
| JP | 4393582 | * | 1/2010 |
| WO | 0053814 A1 | | 9/2000 |
| WO | 0188205 A1 | | 11/2001 |
| WO | 2004081236 A1 | | 9/2004 |
| WO | 2006109225 A1 | | 10/2006 |
| WO | 2008067578 A1 | | 6/2008 |
| WO | 2012045711 A1 | | 4/2012 |
| WO | 2012149560 A2 | | 11/2012 |

OTHER PUBLICATIONS

State Intellectual Property Office of the People's Republic of China, Office Action and Search Report Issued in Application No. 201680074864.5, dated Mar. 15, 2019, 16 pages.

Japanese Patent Office, Office Action Issued in Application No. 2018-533769, dated Jan. 8, 2019, 5 pages.

"Excerpt from: Ullmann's Encyclopedia of Industrial Chemistry, vol. A23: Refractory Ceramics to Silicon Carbide," Fifth, Completely Revised Edition, pp. 73-88, VCH Publishers, Editors: Barbara Elvers et al., Available as Early as Jan. 1, 1993, 18 pages.

White, D. et al., "Antimicrobial resistance: standardisation and harmonisation of laboratory methodologies for the detection and quantification of antimicrobial resistance," Revue scientifique et technique (International Office of Epizootics), vol. 20, No. 3, Dec. 2001, 10 pages.

"Exceprt from: Brock Biology of Microorganisms," Tenth Edition, p. 138, Pearson Education, Editors: Michael T. Madigan et al., Available as Early as Jan. 1, 2003, 3 pages.

Emerstorfer, F. et al., "The role of plant-based antimicrobials in food and feed production with special regard to silage fermentation," Die Bodenkultur, vol. 60, No. 3, Available as Early as Jan. 1, 2009, 11 pages.

Jorgensen, J. et al., "Antimicrobial Susceptibility Testing: A Review of General Principles and Contemporary Practices," Clinical Infectious Diseases, vol. 49, No. 11, Dec. 1, 2009, Published Online Oct. 26, 2009, 7 pages.

Wang, J. et al., "Robust antimicrobial compounds and polymers derived from natural resin acids," Chemical Communications, vol. 48, No. 6, Jan. 21, 2012, Published Online Nov. 17, 2011, 3 pages.

Ashraf, M. et al., "Green biocides, a promising technology: current and future applications to industry and industrial processes," Journal of the Science of Food and Agriculture, vol. 94, No. 3, Feb. 2014, Published Online Aug. 23, 2013, 16 pages.

ISA European Patent Office, International Search Report Issued in Application No. PCT/EP2016/082552, dated Feb. 27, 2017, WIPO, 6 pages.

Lu, Y., "Research on geothermal resources development and problems thereof," Yellow River Water Conservancy Press, Jun. 30, 2005, 5 pages. (See NPL 2, China National Intellectual Property Administration Office Action and Search Report Issued in Application No. 201680074864.5 for Explanation of Relevancy).

China National Intellectual Property Administration, Office Action and Search Report Issued in Application No. 201680074864.5, dated Sep. 18, 2019, 12 pages.

Japanese Patent Office, Office Action Issued in Application No. 2018-533769, dated Jan. 8, 2019, 7 pages.

* cited by examiner

USE OF A PROCESS FLUID WITH AN ENVIRONMENTALLY COMPATIBLE BIOSTABILIZER IN A GEOTHERMAL BOREHOLE

CROSS-REFERENCE TO RELATED APPLICATIONS

The present application is a U.S. National Phase of International Patent Application Serial No. PCT/EP2016/082552 entitled "USE OF A PROCESS FLUID WITH AN ENVIRONMENTALLY COMPATIBLE BIOSTABILIZER IN A GEOTHERMAL BOREHOLE," filed on Dec. 23, 2016. International Patent Application Serial No. PCT/EP2016/082552 claims priority to Eueopean Patent Application No. A 15202340.4, filed on Dec. 23, 2015. The entire contents of each of the above-cited applications are hereby incorporated by reference in their entirety for all purposes.

TECHNICAL FIELD

The invention relates to the use of a process fluid in a geothermal borehole, wherein said process fluid includes a biostabilisater.

BACKGROUND

Geothermics means the technical utilisation of geothermal energy. Geothermal energy is the heat stored in the earth's crust and ranks among the renewable energy sources. It may be utilised either directly (e.g. by means of a heat pump) or indirectly (e.g. for generating electric current). A distinction is drawn between near-surface geothermics (with drills to a depth of up to 400 metres) and deep geothermics (with drilling depths from 400 metres on and usually down to 4000 metres or 5000 metres). A bore to exploit geothermal deposits is called a geothermal bore. In low-enthalpy geothermal heat deposits, as are available for example in the Alpine area, deep geothermal bores are required as a rule. For that matter, the geothermal drilling method (to produce a geothermal borehole) is within the scope of the term geothermics, as used herein, or, when the drilling depth is deeper than 400 metres, is within the scope of deep geothermics, as used herein. In geothermics, process fluids (i.e. fluids which are used in a process or method without getting consumed normally) are made use of which usually include water, for example as a drilling fluid in exploiting the geothermal deposit or as a heat carrier during operating (i.e. exploiting or utilising) the geothermal deposit.

In geothermics, the Hot Dry Rock technique (also known as "Enhanced Geothermal System" or "Hot Fractured Rock") plays a distinctive role. In this process, a process fluid (usually on an aqueous base) is circulated between at least two adjacent geothermal boreholes. During the operation, a colder process fluid is fed to the geothermal deposit (i.e. the geological formation) via the first geothermal borehole and is withdrawn again at the second geothermal borehole in a warmer state, possibly enriched by naturally present deep water. By pressing in the process fluid under high pressure (usually up to 150 bar), the fissures present in the geological formation get widened, and new ones are formed in some circumstances, which massively increases the surface available for an heat exchange between the fluid and the formation. Different to what is common in for example Hydraulic Fracturing in the oil and natural gas production, no filling materials ("proppants") to keep the fissures open are hereby necessary in many cases, because the high pressure is maintained during the operation.

In geothermal drilling processes, it is typically required to pump in a drilling fluid into the geothermal borehole. This drilling fluid (a process fluid) is usually a suspension of ground bentonite in water with further additives. The drilling fluid is usually kept in a continuous cycle. Among others, it usually serves for stabilising the borehole, for exporting the drilling debris, and for discharging the frictional heat caused by the drilling tools.

The interior of the earth's crust has been colonised or is colonisable by numerous species of microorganisms, both in the ground and in the underlying geological formations. Due to their growth and metabolism, many of these microorganisms may complicate or even make impossible geothermics, mainly deep geothermics, and in particular the geothermal drilling process; i.e. these are "undesirable microorganisms". Undesirable microorganisms may, for example, promote corrosion of conducting tubes and of other equipment made of metal by their metabolic products and may clog pipes by forming a slime (i.e. formation of extracellular polymeric substances) or by their growth ("biofilms"). This is also known as "biofouling". In addition, undesirable microorganisms may accumulate in a process fluid without a biostabiliser and may endanger ecological systems and human beings in case this process fluid should leak out of a controlled setting into the environment (e.g. into groundwater).

On these and other grounds, biocides or biostabilisers (also referred to as biostats or biostatic agents) are frequently employed against undesirable microorganisms.

Usually, aggressive biocides such as glutaraldehyde or triazine derivatives are used in geothermics, mainly in deep geothermics, and in particular in the geothermal drilling process, which are harmful to humans and the environment. This problem has been recognised, and research published around environmentally compatible biocides ("green biocides").

However, such alternative biocides of the prior art have one or more disadvantages, such as: higher costs, lower efficiency, especially under the conditions which may prevail in the Earth's crust (e.g. higher temperatures), and for many, especially thermophilic microorganisms, complexity of application. In addition, these are biocides and biostabilisers which may have unclear effects on ecosystems. Furthermore it is advantageous to have as many different and preferably environmentally compatible biocides or biostabilisers available as possible to collectively achieve a broad spectrum of activity against numerous species of undesired microorganisms. The issue of environmental compatibility is most notably in Europe of particular importance, and in fact even a prerequisite for further establishing geothermics, in particular deep geothermics. It is further believed that the effectiveness of the previously used biocides is reduced, among others, by the high salt concentrations which sometimes occur when, for example, a process fluid used in the Earth's crust detaches salt from this Earth's crust.

For these and other reasons, one object of the present invention is to provide a process fluid comprising an environmentally compatible biostabiliser for geothermics (in particular for deep geothermics), i.e. in a geothermal borehole, and in front of all for a geothermal drilling process, i.e. in this case in the form of a drilling fluid, as well as a related production method and a corresponding method of use. In particular, this biostabiliser is to be effective against selected undesirable mesophilic or thermophilic microorganisms; especially those which are prevented only insufficiently from growth or metabolism by the currently used biocides. Specifically, this biostabiliser should be effective in an environmental condition typical of the Earth's crust, especially of geothermally utilisable geological formations. Furthermore, this biostabiliser should be producible and employable as simply and economically as possible because this is required for its industrial scale use.

Accordingly, the present invention relates to a process fluid for a geothermal bore (and the use of the process fluid in a geothermal borehole). The process fluid of the invention comprises a biostabiliser and is characterised in that the biostabiliser is comprised of at least one organic acid or a salt, alcohol or aldehyde thereof, wherein the at least one organic acid is selected from the group consisting of hop acids, resin acids, fatty acids and mixtures thereof.

Surprisingly, these organic acids have been found particularly suitable for biostabilisation in geothermics, in particular in deep geothermics.

Thus, these organic acids are also effective in particular at the higher temperatures which may prevail in geological formations in a depth of 1 km to 5 km, and even against selected unwanted mesophilic or thermophilic microorganisms which can occur or grow in this environment.

These organic acids may be added particularly simply and cost-effectively to obtain the process fluid of the invention— for example, hop acids may be added in the form of a hop extract and selected resin acids may be added in the form of a natural resin, especially rosin—preferably as an alkaline solution of selected resin acids in the form of a natural resin, especially rosin.

Said organic acids have already been proven to be biostabilising in the food production, as described, inter alia, in the documents WO 00/053814 A1, WO 01/88205 A1, WO 2004/081236 A1 and WO 2008/067578 A1. The use in geothermics or even in deep geothermics, is, however, not suggested in these documents. In use in food production, these organic acids have been found to be well tolerated by humans and the environment.

In Emerstorfer et al. the minimum inhibitory concentration of hop beta acids, resin acids and a mixture of resin acids and myristic acid was investigated against various bacteria, yeasts and moulds and was compared to the effect of potassium hydroxide and hydrogen peroxide. The use in geothermics or even in deep geothermics is, however, not suggested in this document.

Although Wang et al. refers to resin acid derivatives as antimicrobial agents, too, but their use in geothermics or even in the Earth's crust, especially in the difficult conditions typical of deep geothermics, is also not suggested in this document.

The subject of US 2003/0015480 A1 is a method using hop acid to control (the growth) of (micro)organisms, for example in the paper production. Uses in geothermics are, however, neither disclose nor suggested.

GB 1 417 237 discloses a drilling mud on an aqueous base. Therein, a tall oil fraction having a high content of resin acid is proposed, but there is no mention of a biostabilising effect or even of a geothermal bore. The range of concentrations for the tall oil fraction represented as being essential for its lubricity is between 0.45% and 3% (v/v), i.e. substantially higher than the range preferred for the biostabilising effect of between 0.25 and 500 ppm.

US 2015/353806 relates to concentrates to be added into drilling fluids to improve the lubricity of them. Among others, "the acids [ . . . ] of resin acids" are mentioned as feasable contents of the concentrate to improve the lubricity but even in this document there is no mention of either a biostabilising effect or a geothermal bore. None of the documents mentioned anticipates the present invention nor does any of them lead to it.

Its use in geothermics requires large amounts (volumes) of the process fluid of the invention. Preferably, the process fluid of the invention is thus provided in an amount of at least $10^4$ L, preferably at least $10^5$ L, specifically at least $10^6$ L. In a geothermal drilling process, for example, from $10^5$ to $10^7$ liter of the process fluid of the present invention are usually required as a drilling fluid.

The crust is the outermost solid shell of the earth and may extent to a depth of approximately 100 km, on average approximately to a depth of 35 km. The top layer of the Earth's crust ususally forms the ground, with a usual depth of about 10 m-20 m. Below lies a wide variety of geological formations with different widths. Generally, the temperature of the Earth's crust increases with every kilometer depth by about 25° C.-30° C., with considerable local deviations.

For example, the geothermal deposits which are to be mined by deep geothermics are often at a depth of 1-3 km, so that the temperature there may usually be 25°-90° C.; thus, depending on local conditions, mesophilic, thermophilic and/or hyperthermophilic microorganisms are playing a role especially in deep geothermics. In one kilometer of depth, temperatures of more than 50° C., a pore pressure of more than 30 MPa and pH values of less than 6 are the environmental conditions to be expected there. Depending on local conditions, halophilic or halo-tolerant microorganisms are playing a role especially in deep geothermics, too.

In addition to the microorganisms resident in their respective depths, the growth of them sometimes has to be combatted, which were, for example, introduced by the pumping of the process fluid itself into the respective depth.

In the following, the microorganisms undesirable especially in deep geothermics will be described: the undesirable microorganisms are selected from the group of bacteria, fungi and archaea, preferably they are selected from the group of bacteria. Particularly undesirable are microorganisms (in front of all bacteria) which produce one or more of the following: acid, extracellular polymeric substances (e.g. in biofilms), and sulphides. Particularly undesirable are sulphide producers, among others because of the resulting odor, health concerns, and the corrosion caused by the resulting sulphides Preferably, the undesired microorganisms are bacteria. They preferably belong to the phylum of Firmicutes, Bacteroidetes, Actinobacteria or Proteobacteria, especially to the phylum of Firmicutes. They preferably also belong to one of the following genera: *Pseudomonas, Cobetia, Shewanella, Thermoanaerobacter, Arcobacter, Pseudoalteromonas, Marinobacterium, Halolactibacillus* (also known as *Halolactobacillus*), *Selenihalanaerobacter, Vibrio, Desulfovibrio, Burkholderia, Arcobacter, Dietzia, Microbacterium, Idiomarina, Marinobacter, Halomonas* and *Halanaerobium*, more preferably to a genus selected from *Halolactibacillus* and *Halanaerobium*.

Out of the archaea, particularly undesired are the genera *Methanosarcinales, Methanohalophilus* and *Methanolobus*.

It has been found as part of the invention that the process fluid with the inventive biostabiliser is effective against many of these undesired microorganisms, preferably against many of the firmicutes or actinobacteria, especially against sulphide producing firmicutes. It was particularly surprising that the inventive process fluid with the biostabiliser was effective against bacteria selected from the genera *Dietzia, Microbacterium, Halolactibacillus* and *Halanaerobium*.

The inventive process fluid is particularly effective against members of *Halolactibacillus*. It can be assumed that conventional environmentally harzardous biocides-unlike the biostabiliser according to the invention—are insufficiently effective against *Halolactibacillus*.

The genus *Halolactibacillus* includes, for example, *H. halophilus* and *H. miurensis*. The biostabiliser according to the present invention is particularly effective against both of these types.

The biocides used hitherto act only insufficiently especially against *Halanaerobium*. The genus *Halanaerobium* includes for example *Halanaerobium congolense*, which grow well for example at a mass concentration of 10% NaCl and 45° C. under anaerobic conditions and which can reduce thiosulphate or sulphur compounds to sulphides which may result in an undesirable odor development. Also *Halanaerobium praevalens* is particularly undesirable.

Said organic acids or constituents which contain said organic acids are known per se from, inter alia, the documents WO 00/053814 A1, WO 01/88205 A1, WO 2004/081236 A1 and WO 2008/067578 A1. All production processes or preparation methods described in these documents, especially for hop extract, natural resin or myristic acid, or a salt thereof, are preferred according to the present invention.

Hop acids are ingredients of unfertilised blossoms of female hop plants. These bitter-tasting hop ingredients have been used for the production of storable beer for centuries and have, thus, even found their way into human nutrition. The environmental compatibility, especially at the final concentrations proposed herein, is thus given.

The hop plant *Humulus lupulus* belongs to the botanical family of Cannabaceae; hop is cultivated in many countries and used for the production of beer. Unfertilised female hop plants form the so-called hop cones which are holding the hop resin. Hop resin, in turn, contains the most varying kinds of biostabilising substances. The hop ingredients can be extracted using ethanol or supercritical $CO_2$.

The bitter constituents recoverable from the hop resin include various fractions such as humulone (alpha acid) and lupulone (beta acid). These substances have microbiological inhibitory activity and can be converted into their isoforms by heating, whereby better water solubility is given at a still existing inhibitory effect on undesired microorganisms. To increase the solubility and prevent precipitation at storage, it is sometimes favorable to add myristic acid in small amounts as a technical excipient already in the preparation process. Examples of suitable hop acids can also be found in WO 00/053814 A1.

Even many fatty acid compounds are physiologically harmless natural products. The environmental compatibility particularly in the final concentrations suggested herein is thus given. The fatty acid compounds according to the present invention may also be fatty acid alcohols or fatty acid aldehydes. The fatty acid compounds may also be modified such as by the incorporation of functional groups such as —OH, —SH, —$NH_2$, —F, —Cl, —Br, —I, and the like (except derivatives which are toxic to humans, animals or plants); aliphatic side chains and/or one or more (especially two or three) (unsaturated) double bonds are possible as well, as long as the physico-chemical properties of the (aliphatic) backbone, in particular the solubility in biostabilising concentrations as well as the structure of the C1 atom are preserved. The biostabilising effect of fatty acids is known for example from WO 2004/081236 A1. In general, experiments have shown that in general the free fatty acids and their soaps according to the present invention have better antimicrobial efficacy than their aldehydes or esters. In particular myristic acid or its soap has proven particularly useful in the invention, especially with respect to its antimicrobial activity.

Tree resins from pine, for example, and the rosin obtained therefrom by distillation which consists mostly of resin acids, have bactericide properties which have been used for human consumption for centuries. The environmental compatibility, especially at the final concentrations proposed herein, is thus given.

Preferably, the resin acids or the resin are obtained from pines. Pines, such as the austrian black pine *Pinus nigra Austriaca*, belong to the botanical family of Pinaceae; they are primarily widespread in the northern hemisphere and the resins therefrom have a long tradition in the production of Retsina, a Greek resinated wine. To obtain the biostabilisingly active ingredients the pine resin is preferably separated by distillation into the two fractions turpentine and rosin. Rosin now consists of the active ingredients which are a mixture of resin acids. These can be dissolved with alkalis to alkaline resinates.

Rosin is a mixture of aromatic compounds such as abietic acid, dehydroabietic acid and isomers thereof. These so-called resin acids, which are commercially available in the form of solid rosin blocks, have a biostabilising activity of varying degrees and can be used as water soluble alkali resinates. To increase the solubility and prevent precipitation of the resin soap at storage it is favorable to add myristic acid in small amounts as a technical exzipient already in its preparation process.

According to the invention, all food-compatible resins, such as described for example in "Ullmann's Encyclopedia of Industrial Chemistry", Vol. A 23 (1993) pages 73-88, can be used, such as wood resins, more particular balms, such as benzoin, pine balm, myrrh and tolu balm. For reasons of economy and in accordance with the invention, mainly rosin products and their derivatives are preferred. Products like this are described for example in Ullmann's Encyclopedia of Industrial Chemistry, Vol. A 23 (1993) pages 79-88.

Partly because of the above-described surprising biostabilising effect in terms of selected mesophilic, thermophilic, hyperthermophilic, halo-tolerant and/or halophilic bacteria, in particular of the phylus Firmicutes or Actinobacteria, is the process fluid of the present invention in a preferred embodiment provided for use in a geothermal borehole in deep geothermics. In particular, the process fluid of the invention is provided for a geothermal borehole in a Hot Dry Rock-process.

In the course of the present invention it has been shown that the inventive process fluid acts particularly well biostabilising with respect to the unwanted microorganisms mentioned herein, when biopolymers such as polysaccharides, especially starch and modified starches, are included as a gelling agent. These biopolymers are very vulnerable to microbial decomposition for example in the geothermal borehole. On the other hand, an (intentional) decomposition of the components added to the process fluid such as the biopolymers and/or the inventive biostabilisers may be desirable after a certain time. Both can be realised with the present invention, because the degradation of these substances—due to its harmlessness in principle and its fundamentally safe biodegradability—can be controlled to a certain extent.

Therefore, the process fluid of the invention is characterised in a preferred embodiment in that it further contains at least one gelling agent, wherein the gelling agent is a biopolymer or a polymeric derivative thereof; preferably, wherein the biopolymer is a polysaccharide, preferably a starch, a vegetable gum such as xanthan, a cellulose, in particular a polyanionic cellulose, or a pectin, especially a starch. According to the invention, any derivatisation of the biopolymer deemed appropriate by one of skill in the art is, among other things, possible in this embodiment; however, the gelling properties of the biopolymer must essentially be retained or—with respect to degradability—must be adjustable or controllable. Preferred biopolymers or derivatives thereof are also disclosed in WO 2012/045711 A1, U.S. Pat. No. 4,659,811, WO 2006/109225, U.S. Pat. No. 5,681,796, 4,964,604, 4,169,798 or 6,810,959, or in selected ones of the above quoted documents.

In a further preferred embodiment of the invention the inventive process fluid is used as a drilling fluid in a geothermal borehole. The inventive process fluid has proven to be particularly suitable for this purpose (see Example 1B).

In the process fluid of the invention further components can be contained, among others components which are typical for a drilling fluid, or another use, in geothermics or deep geothermics, or any other components which one of skill in the art might deem expedient for use in a geothermal borehole. Preferably, one or more substances are present selected from the following groups: gelling agents, in particular those mentioned two paragraphs further above; buffering agents, in particular those selected from acetic acid, fumaric acid, potassium carbonate, borax, sodium acetate, sodium bicarbonate, sodium carbonate, sodium hydroxide; and clay minerals, in particular bentonite, in a finely granulated form (e.g. ground). Example 1A shows an inventive process fluid, which was successfully used as a drilling fluid in a geothermal borehole.

Surprisingly it has been found that it is advantageous if a defoamer is contained in the inventive process fluid, in particular when it is used as a drilling fluid (see Example 1B). Preferably, this defoamer is based on non-ionic surfactants, for example on fatty alcohol alkoxylate or alkylene oxide polymer basis. A suitable product is for example BASOPUR® DF 5 of BASF SE.

Preferably, the process fluid of the present invention comprises water.

Surprisingly, in the context of the present invention, it has been found that when it contains water or water is added, the process fluid of the present invention acts as a better biostabiliser with regard to undesirable microorganisms mentioned herein the softer the water is or will be made. The inventive process fluid acts as a particularly good biostabiliser when the hardness is at most 20° dH (German Hardness) or 3.57 mmol/l (alkaline earth ions), preferably at most 15° dH or 2.67 mmol/l, more preferably at most 10° dH or 1.78 mmol/l, yet more preferably at most 7.5° dH or 1.34 mmol/l, in particular at most 5° dH or 0.89 mmol/l. The inventive use of the process fluid, in particular in deep geothermics, means that alkaline earth ions can be taken up into solution, resulting in a higher hardness.

Therefore, the process fluid of the present invention is in a preferred embodiment characterised in that it further comprises a water softener. All water softener which deem expedient to one skilled in the art are appropriate. Preferably, the water softener is a cation exchanger or a chelator, in particular selected from: zeolites (such as zeolite A), inorganic polyphosphates (such as triphosphate), ethylenediamine tetraacetic acid and salts thereof, nitrilotriacetic acid and salts thereof, polyacrylates, and citrate (or citric acid).

It has been found that the inventive process fluid acts particularly well biostabilising in regard to the undesirable microorganisms mentioned herein if a plurality of the named organic acids is contained therein. This results in a synergistic effect with respect to the biostabilising effect. Therefore, another preferred embodiment of the present invention relates to the inventive process fluid, further characterised in that the biostabiliser comprises a mixture, which is preferably selected from:

at least one hop acid, or a salt, alcohol or aldehyde thereof, and at least one fatty acid, or a salt, alcohol or aldehyde thereof, or at least one resin acid, or a salt, alcohol or aldehyde thereof, and at least one fatty acid, or a salt, alcohol or aldehyde thereof, or at least one hop acid, or a salt, alcohol or aldehyde thereof, and at least one resin acid, or a salt, alcohol or aldehyde thereof, and at least one fatty acid, or a salt, alcohol or aldehyde thereof;

in particular wherein the biostabiliser is a mixture of at least one hop acid, or a salt, alcohol or aldehyde thereof, and at least one resin acid, or a salt, alcohol or aldehyde thereof, and at least one fatty acid, or a salt, alcohol or aldehyde thereof.

In the course of the present invention, one biostabiliser has surprisingly proven particularly effective in regard of the undesired microorganisms mentioned herein, comprising at least one selected from hop extract, a natural resin (especially rosin) and myristic acid or a salt thereof. Consequently, the process fluid of the present invention is in a particularly preferred embodiment characterised in that the biostabiliser is a mixture of at least one, preferably at least two, in particular all of the following components: hop extract, natural resin, preferably rosin, wherein the natural resin is preferably added in dissolved form, and myristic acid or a salt thereof. Another particularly preferred embodiment relates to the process fluid according to the invention, which is further characterised in that the biostabiliser is obtainable by adding at least one, preferably at least two, in particular all of the following components: hop extract, natural resin, preferably rosin, wherein the natural resin is preferably added in dissolved form, and myristic acid or a salt thereof.

Preferably, the hop acid of the present invention consists in an alpha hop acid, selected from the group consisting of humulone, isohumulone, cohumulone, adhumulone, prehumulone, posthumulone, tetrahydroisohumulone, and tetrahydrodeoxyhumulone, or a beta hop acid, selected from the group consisting of lupulone, colupulone, adlupulone, prelupulone, postlupulone, hexahydrocolupulone, and hexahydrolupulone, because these are suitable for biostabilisation.

Preferably the resin acid of the present invention is selected from the group consisting of pimaric acid, neoabietic acid, abietic acid, dehydroabietic acid, levopimaric acid, and palustrinic acid, because these are suitable for biostabilisation.

Preferably the fatty acid of the present invention is selected from the group consisting of capric acid, undecylenic acid, lauric acid, myristic acid, palmitic acid, margaric acid, stearic acid, arachinic acid, behenic acid, lignoceric acid, cerotic acid, palmitoleinic acid, oleic acid, elaidic acid, vaccenic acid, icosenoic acid, cetoleic acid, erucic acid, nervonic acid, linoleic acid, linolenic acid, arachidonic acid, timnodonic acid, clupanodonic acid, and cervonic acid, because they are suitable for biostabilisation. Particularly preferred is myristic acid.

Investigations in the course of the present invention have come to concentration ranges for the biostabiliser's components which are particularly suitable for biostabilisation regarding undesirable microorganisms. Thus, another preferred embodiment of the present invention refers to an inventive process fluid which is characterised in that:

the total concentration of hop acids in the process fluid is 0.01-1000 ppm, preferably 0.05-100 ppm, more preferably 0.1-10 ppm, particularly 0.5-5 ppm; and/or the total concentration of resin acids in the process fluid is 0.05-5000 ppm, preferably 0.25-500 ppm, more preferably 0.5-50 ppm, particularly 0.25-25 ppm; and/or the total concentration of fatty acids in the process fluid is 0.05-5000 ppm, preferably 0.25-500 ppm, more preferably 0.5-50 ppm, particularly 0.25-25 ppm.

Preferably, "ppm" ("parts per million") refers to the percentage of each organic acid(s) (in mg) of the total mass of the process fluid (in kg), i.e. ppm stands for mg/kg.

The stated concentrations are final biostabiliser concentrations, i.e. the process fluid can be pumped with the mentioned final concentrations of the biostabiliser into the geothermal borehole and can there unfold its biostabilising effect, in addition to the technical result for each specific application. The process fluid is compatible with the environment in particular with these final concentrations.

In selected situations, it is necessary to enlarge the biostability effective spectrum of the process fluid of the present invention or to provide additional biocide effects therewith. Therefore, the inventive process fluid is in a further preferred embodiment characterised in that it further comprises at least one other microbially active substance and/or biostabiliser, preferably selected from acetic acid, lactic acid, propionic acid, benzoic acid, sorbic acid, formic acid, and salts thereof; chitosan and chitosan derivatives, such as disclosed in WO 2012/149560 A2, are preferred, too.

In a further aspect of the present invention, the use of the inventive process fluid in a geothermal borehole, preferably for deep geothermics, in particular for the Hot Dry Rock process, is disclosed. In a preferred embodiment, at least $10^4$ L, preferably at least $10^5$ L, in particular at least $10^6$ L of the inventive process fluid are used. Preferably, an undesirable microorganism is inhibited in its growth and/or metabolism by the biostabiliser of the process fluid, which is a bacteria, preferably selected from the phylum of Firmicutes, Actinobacteria, Bacteroidetes, or Proteobacteria, in particular of the phylus of Firmicutes or Actinobacteria. This undesirable microorganism further belongs to a genus of bacteria selected from *Pseudomonas, Cobetia, Shewanella, Thermoanaerobacter, Arcobacter, Pseudoalteromonas, Marinobacterium, Halolactibacillus, Selenihalanaerobacter, Vibrio, Desulfovibrio, Burkholderia, Arcobacter, Dietzia, Microbacterium, Idiomarina, Marinobacter, Halomonas* and *Halanaerobium*, more preferably to a genus selected from *Dietzia, Microbacterium, Halolactibacillus* and *Halanaerobium*.

In a further preferred embodiment the inventive process fluid is used in a depth of 100 m-8000 m, preferably of 200 m-7000 m, more preferably of 300 m-6000 m, even more preferred of 400 m-5000 m, particularly of 500 m-4000 m or even of 600 m-3500 m.

The inventive process fluid is preferably employed for use as a drilling fluid.

Another aspect of the present invention relates to a method for biostabilising a geothermal borehole, preferably for deep geothermics, in particular for a Hot Dry Rock process, comprising pumping the process fluid into the borehole. In a preferred embodiment at least $10^4$ L, preferably at least $10^5$ L, in particular at least $10^6$ L of the inventive process fluid are pumped into the geothermal borehole.

In a further preferred embodiment of the process for biostabilising a geothermal borehole, the inventive process fluid is used in a depth of 100 m-8000 m, preferably of 200 m-7000 m, more preferably of 300 m-6000 m, even more preferred of 400 m-5000 m, particularly of 500 m-4000 m or even of 600 m-3500 m in the geothermal borehole. In this process, the inventive process fluid is preferably used as a drilling fluid.

Preferably, in the inventive process for biostabilisation, an unwanted microorganism is inhibited in its growth and/or metabolism by the biostabiliser of the process fluid, which is a bacteria, preferably selected from the phylus of Firmicutes, Actinobacteria, Bacteroidetes or Proteobacteria, in particular of the phylus of Firmicutes or Actinobacteria. This undesirable microorganism further belongs to a genus of bacteria selected from *Pseudomonas, Cobetia, Shewanella, Thermoanaerobacter, Arcobacter, Pseudoalteromonas, Marinobacterium, Halolactibacillus, Selenihalanaerobacter, Vibrio, Desulfovibrio, Burkholderia, Arcobacter, Dietzia, Microbacterium, Idiomarina, Marinobacter, Halomonas* and *Halanaerobium*, more preferably to a genus selected from *Dietzia, Microbacterium, Halolactibacillus* and *Halanaerobium*. In a further aspect of the present invention, a method for preparing the inventive process fluid is disclosed, wherein the process fluid comprises water. The method comprises adding at least one organic acid or a salt, alcohol or aldehyde thereof, to water or a water-containing portion of the process fluid, wherein the at least one organic acid is selected from the group consisting of hop acids, resin acids, fatty acids, and mixtures of two or all of them. In a preferred embodiment at least $10^4$ L, preferably at least $10^5$ L, in particular at least $10^6$ L of the inventive process fluid are prepared.

If the inventive process fluid comprises a resin acid, it is extremely economical to add it in the form of a resin or a distillate thereof, especially rosin. Consequently, the preparation method of the invention is, if at least one resin acid will be supplied, characterised in a preferred embodiment in that the at least one resin acid is added in the form of a resin, preferably of a natural resin, even more preferred in the form of rosin. In another embodiment it is favorable to employ in doing so a dissolved, emulsified or dispersed, or pasty, rosin product, preferably based on pine resin, pine balm, rosin acids, salts of rosin acids (resin soaps), non-denatured derivatives of pine resins (i.e. derivatives, obtained without the influence of strong acids or bases). As rosin derivatives, preferred according to the invention are also individual components of rosin which are either chemically synthesised or isolated from rosin products, such as levopimaric acid, neoabietic acid, palustrinic acid, abietic acid, dehydroabietic acid, tetrahydroabietic acid, dihydroabietic acid, pimaric acid, and isopimaric acid. Derivatisation of rosin may within the meaning of the invention further provide for hydrogenation, polymerisation, addition reactions, esterification, nitrilation, amination etc. In the embodiments described in this paragraph it is particularly preferred if the respective resin acid containing component (such as the resin or a distillate thereof) is added as an alcoholic solution or suspension, preferably as a 1 to 95%, especially as a 10 to 80% solution of ethanol, or as an alkaline solution, preferably a 0.5 to 35% alkaline solution (the at least one fatty acid may also be added in an alkaline solution as just described).

It may also be expedient in the preparation process according to the invention to add, if at least one resin acid and/or fatty acid is to be added, this at least one resin acid and/or fatty acid as a saline solution or suspension, preferably as a potassium salt solution, particularly as a 0.5 to 35% potassium salt solution.

For economic reasons, it is preferable to add, if at least one hop acid is to be added in the preparation process, this at least one hop acid in the form of a hop extract. The production of hop extract itself has been known for long, and usually the extraction from unfertilised blossoms of female hop plants is effected with alcohol, especially ethanol, as a solvent, or preferably by extraction with supercritical $CO_2$. Other preferred variants of the addition of hop extract are disclosed in WO 00/053814 A1.

In a further preferred embodiment of the present invention, the preparation process of the invention further comprises the addition of a further antimicrobial agent or of stabiliser to water or a water-containing portion of the process fluid, preferably selected from acetic acid, lactic acid, propionic acid, benzoic acid, sorbic acid, formic acid and salts thereof. The addition of chitosan and chitosan derivatives, such as disclosed in WO 2012/149560 A2, is also preferred.

Further preferred features of the preparation process according to the invention are disclosed in the documents of WO 00/053814 A1, WO 01/88205 A1, WO 2004/081236 A1 or WO 2008/067578 A1.

The inventive process fluid may for example be a liquid, a gel or a liquid foam. Preferably, the process fluid contains water. Preferably, the process fluid is a liquid or a gel.

Furthermore, it is preferable that the biostabiliser of the process fluid of the invention is dissolved in particular in water or the water containing portion of the process fluid—however, the biostabiliser may, partly or wholly, be provided in suspension or emulsion in the process fluid of the invention.

A biostabiliser is understood to be a substance which may slow down or inhibit the growth (in particular the proliferation) and/or the metabolism of microorganisms such as bacteria, archaea or fungal cells. In contrast, a biocide is understood to be a substance which kills microorganisms. In this regard, a biocide acts more aggressive than a biostabiliser. To those skilled in the art it is evident that a biostabiliser may also act as a biocide under special circumstances (e.g. at high doses in highly susceptible microorganisms etc.).

The biostabilising effect of a substance can be measured in many different ways, which are known in the art, among others by means of methods such as are disclosed in the documents cited herein. Preferred methods for determining the biostabilising effect are the microdilution test, spot test or well diffusion test. Also, the methods disclosed in White et al. or in Jorgensen and Ferraro are preferred.

For the measurement of the biostabilising effect, the substance is often added to a sample up to one or more particular concentrations (e.g. 0.1 ppm, 0.5 ppm, 1 ppm, 5 ppm, 10 ppm, 25 ppm, 50 ppm, 100 ppm, 200 ppm, 300 ppm, 400 ppm, 500 ppm, 1000 ppm, 5000 ppm, 10000 ppm), wherein the sample comprises the living undesirable microorganism and may, for example, be a pure culture, a mixed culture, a sample taken from the Earth's crust or a sample which is similar to a sample taken from the Earth's crust (e.g. sewage sludge). Then the biostabilising effect of the substance can be determined by comparing the sample with the substance after one or more certain time periods (e.g. 1 d, 2 d, 3 d, 4 d, 5 d, 10 d, 20 d, 30 d, 60 d, 90 d, 120 d) with itself at the initial time point and/or with a control (the sample without the substance, e.g. with water instead of the substance). This comparison may be a direct comparison, including: determining the number of bacteria by plating and determining the CFU/ml (colony forming units) or measuring the turbidity (e.g. determining the OD600). This comparison may as well be an indirect comparison, e.g. the measurement of an undesired effect which may be caused by the undesirable microorganism (e.g. sulphide production, acid production, production of extracellular polymeric substances). Particularly in deep geothermics, a reduced microbial sulphide production can be an important parameter to determine the suitability of the substance as a biostabiliser. A biostabiliser preferably has one or more of the described effects on selected undesirable microorganisms, such as those mentioned herein: Lower increase in biomass than in the control, lower sulphide production than in the control, lower acid production than in the control, lower production of extracellular polymeric substances than in the control, lower biofilm production than in the control.

According to Brock Biology of Microorganisms, page 138, the terms mesophilic, thermophilic, hyperthermophilic, halo-tolerant, and halophilic are to be understood as follows:

Mesophilic: refers to a microorganism which grows best between 20° C. and 45° C.; thermophilic: refers to a microorganism which grows best between 45° C. and 80° C.; hyperthermophilic: refers to a microorganism which grows best at 80° C. and higher; halo-tolerant: refers to a microorganism which can grow in high salt concentrations (e.g. a mass concentration of 25% NaCl); halophilic: refers to a microorganism which needs high salt concentrations (e.g. a mass concentration of 25% NaCl) for growth.

The present invention is further illustrated by the following figures and examples, to which it will of course not be limited.

50 ppm, (L) 100 ppm, (M) 250 ppm of biostabiliser B. The dose-dependent tendency towards biostabilisation is clearly evident.

Figure 1A:
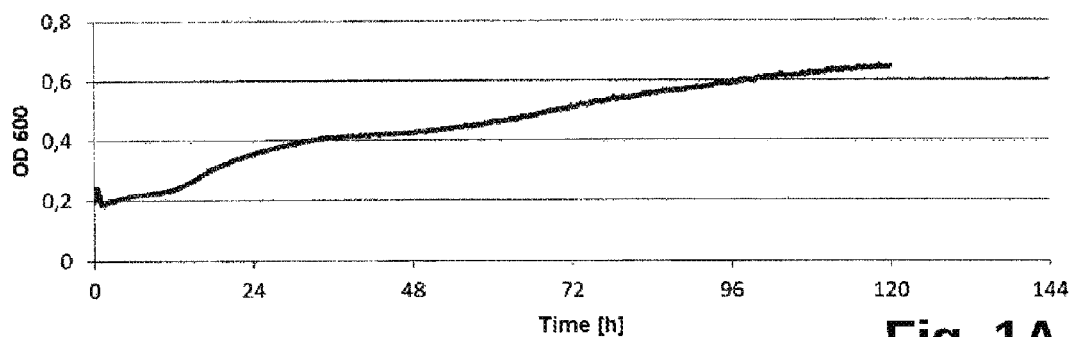
FIGS. 1A-1M: Effect of the biostabilisers on *Halanaerobium congolense*. In accordance with example 4, the strain DSM 11287 was exposed to biostabiliser A (hop acid) or to biostabiliser B (resin acid/myristic acid) in various concentrations. Shown is the (A) growth curve without biostabiliser; growth curve at (B) 0.5 ppm, (C) 1 ppm, (D) 10 ppm, (E) 50 ppm, (F) 100 ppm, (G) 250 ppm of biostabiliser A; and growth curve at (H) 0.5 ppm, (I) 1 ppm, (J) 10 ppm, (K) 50 ppm, (L) 100 ppm, (M) 250 ppm of biostabiliser B. The dose-dependent tendency towards biostabilisation is clearly evident.
Figure 1B:
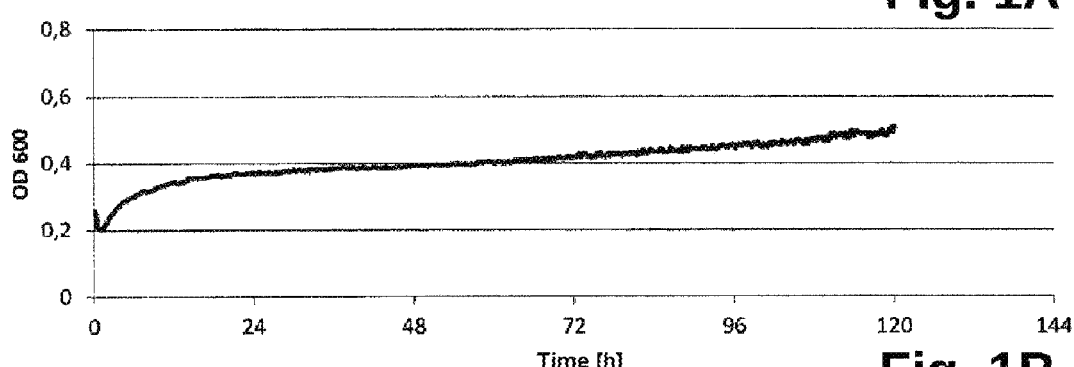
Figure 1C:
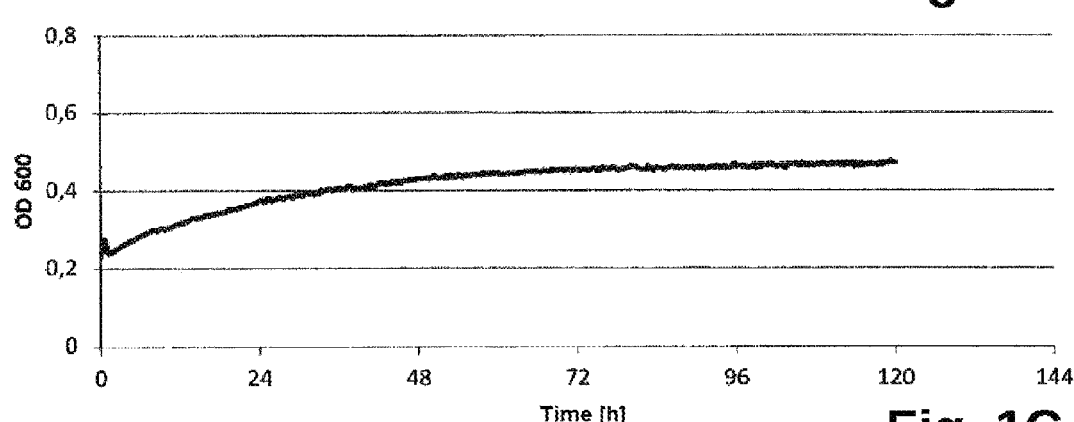
Figure 1D:
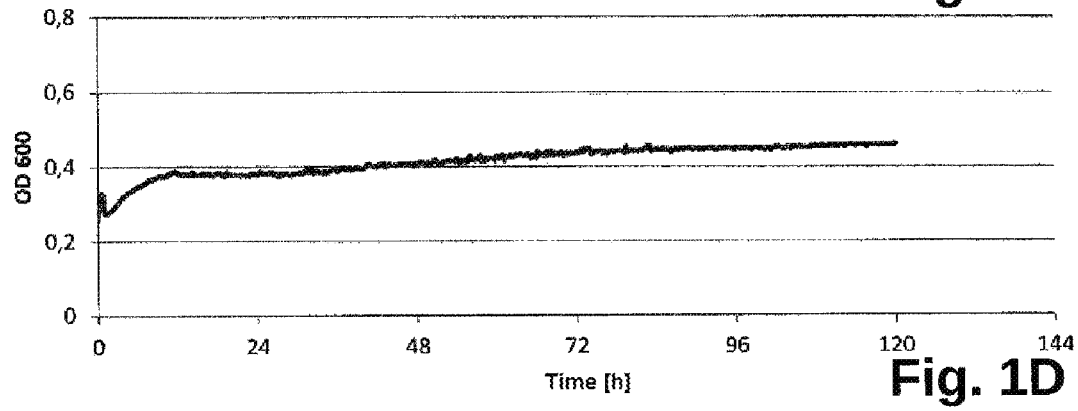
Figure 1E:
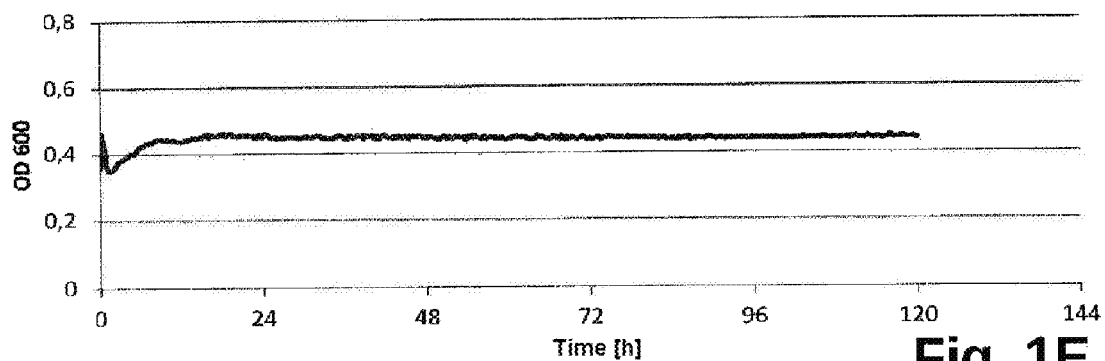
Figure 1F:
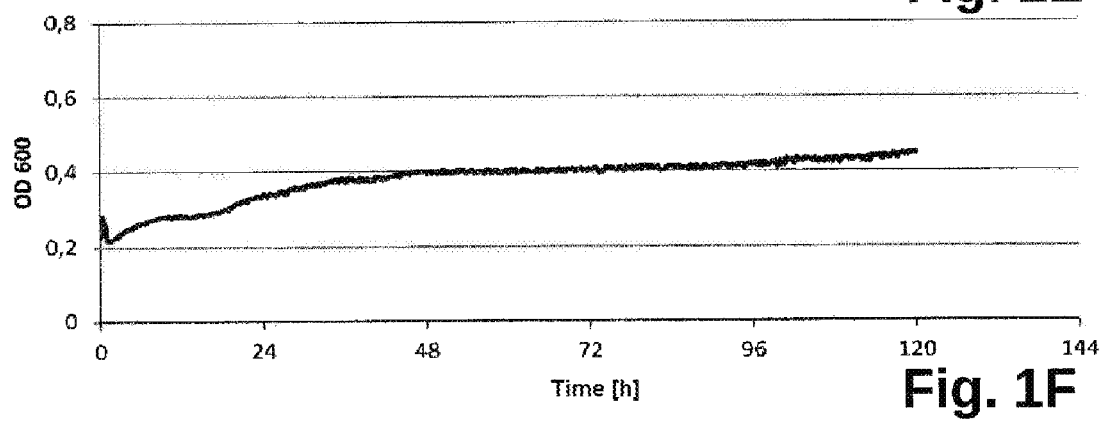
Figure 1G:
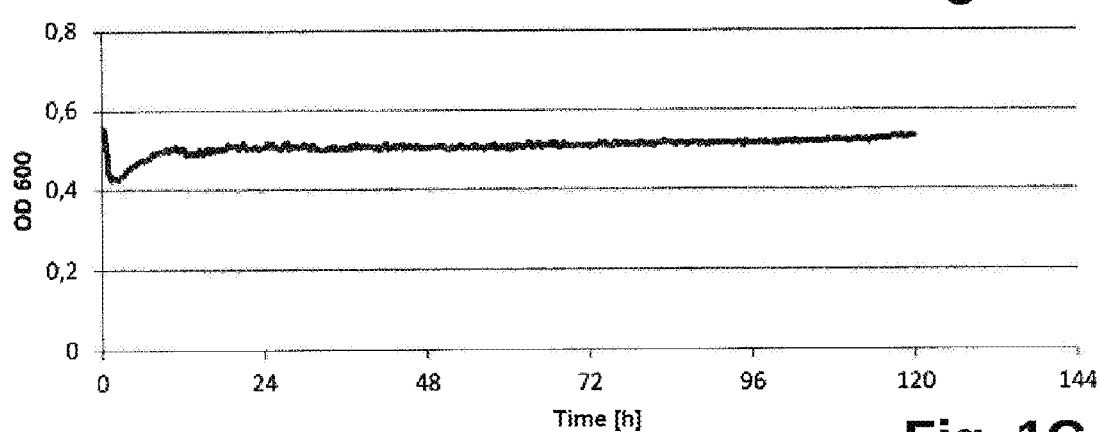
Figure 1H:
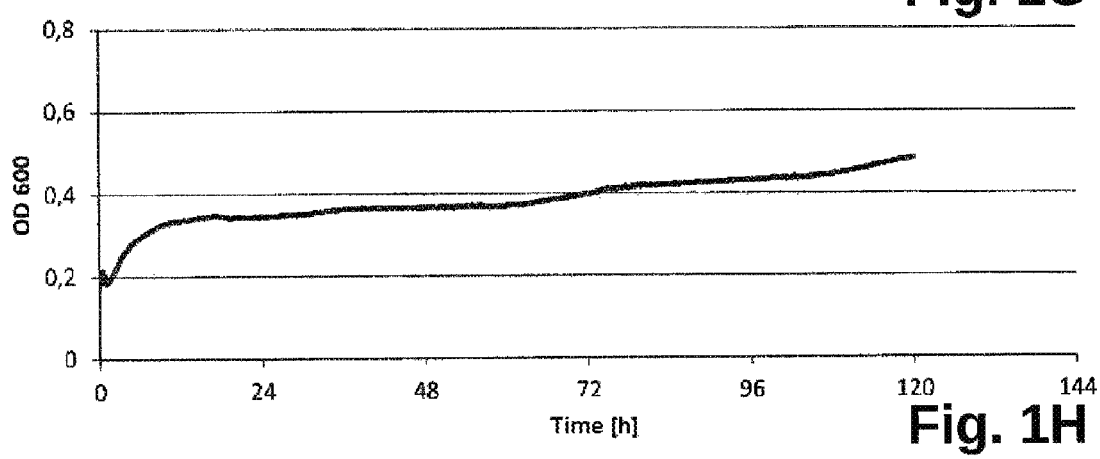
Figure 1I:
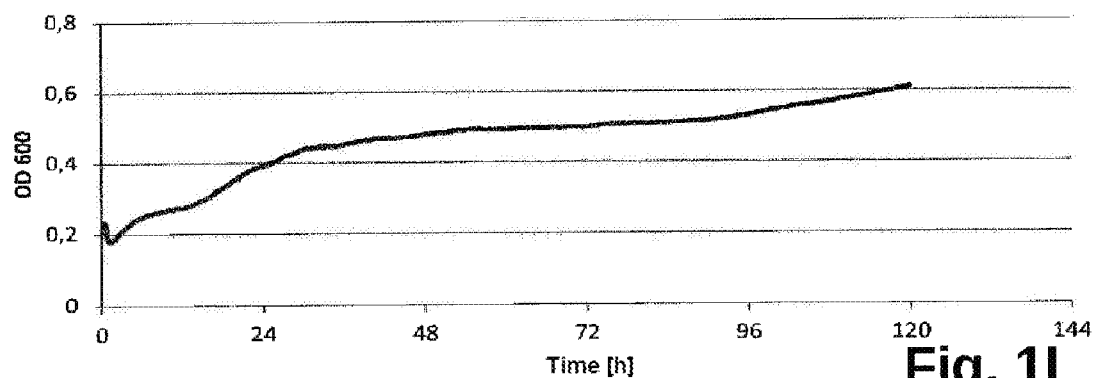
Figure 1J:
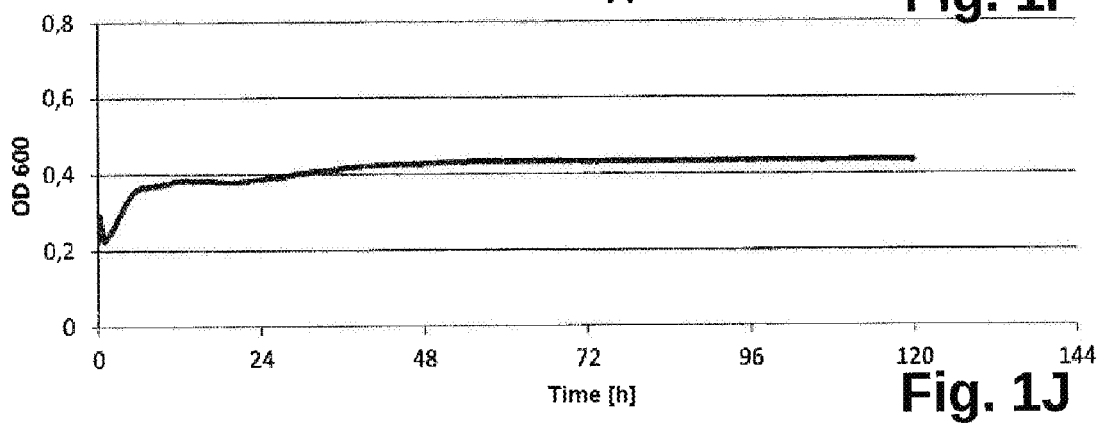
Figure 1K:
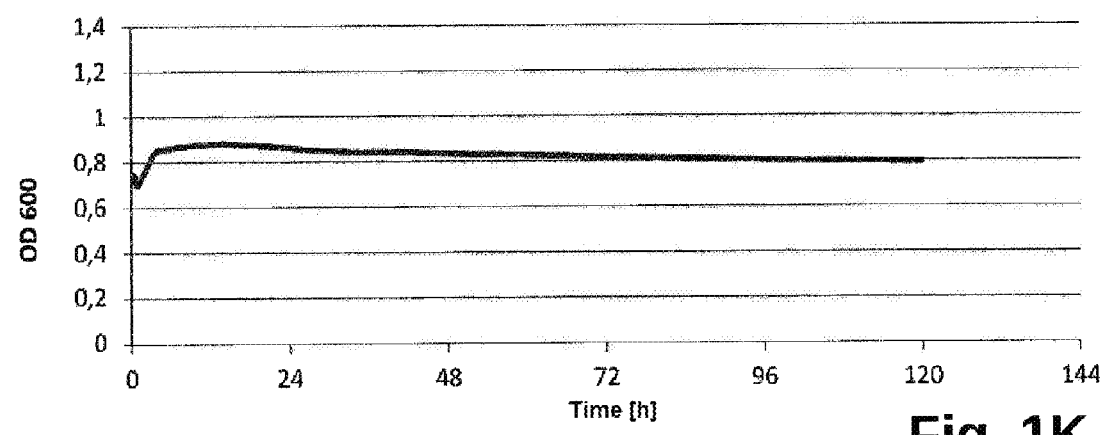
Figure 1L:
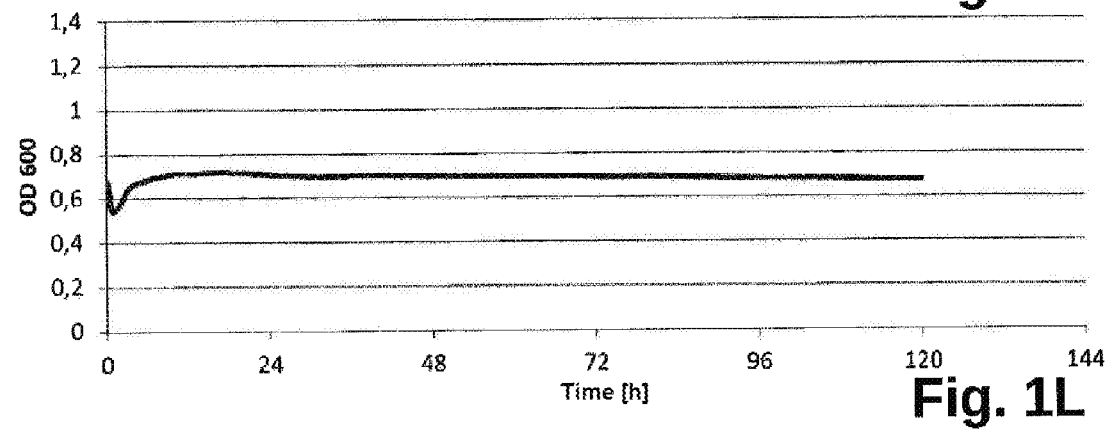
Figure 1M:
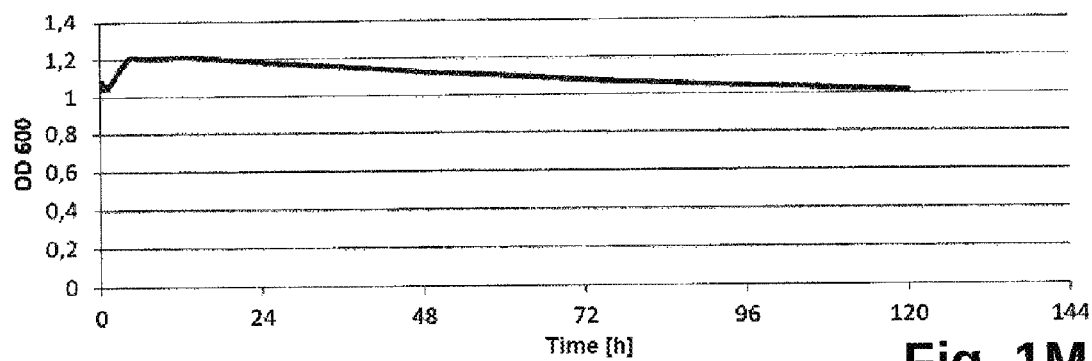
Figure 2A:
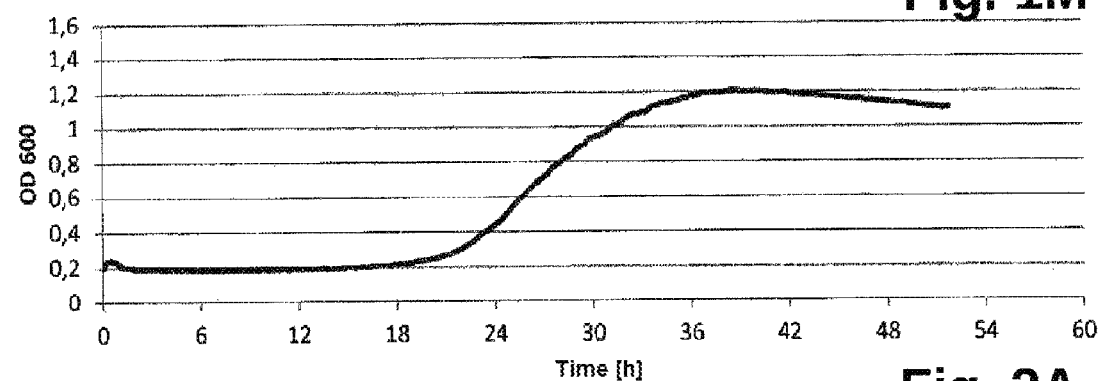
FIGS. 2A-2M: Effect of the biostabilisers on *Halolactibacillus miurensis*. In accordance with example 4, the strain DSM 17074 was exposed to biostabiliser A (hop acid) or to biostabiliser B (resin acid/myristic acid) in various concentrations. Shown is the (A) growth curve without biostabiliser; growth curve at (B) 0.5 ppm, (C) 1 ppm, (D) 10 ppm, (E) 50 ppm, (F) 100 ppm, (G) 250 ppm of biostabiliser A; and growth curve at (H) 0.5 ppm, (I) 1 ppm, (J) 10 ppm, (K) 50 ppm, (L) 100 ppm, (M) 250 ppm of biostabiliser B. The dose-dependent tendency towards biostabilisation is clearly evident.
Figure 2B:
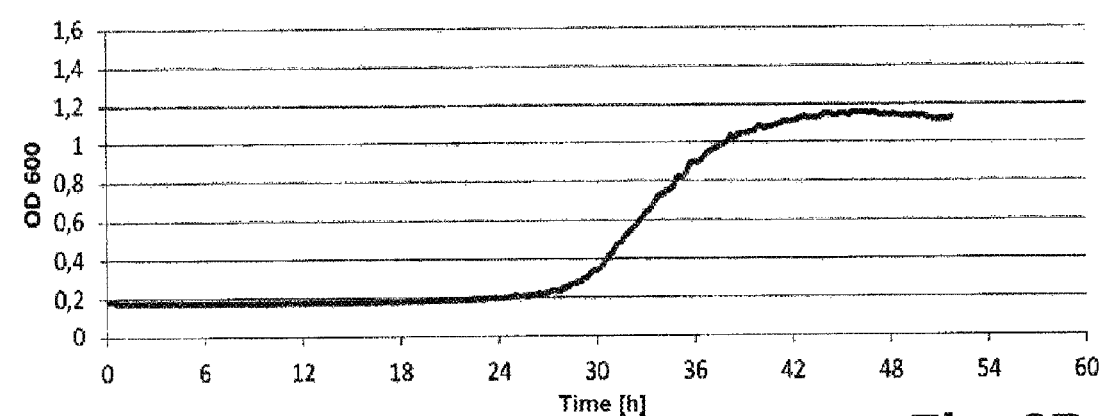
Figure 2C:
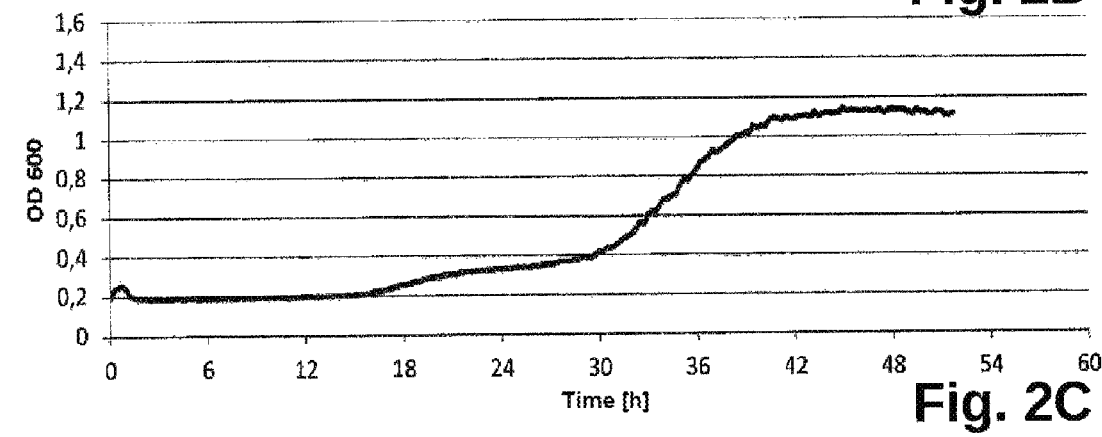
Figure 2D:
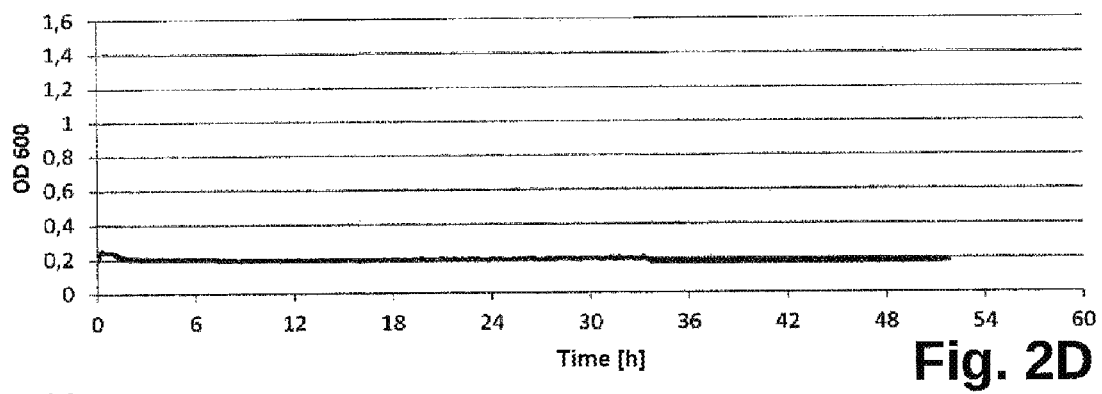
Figure 2E:
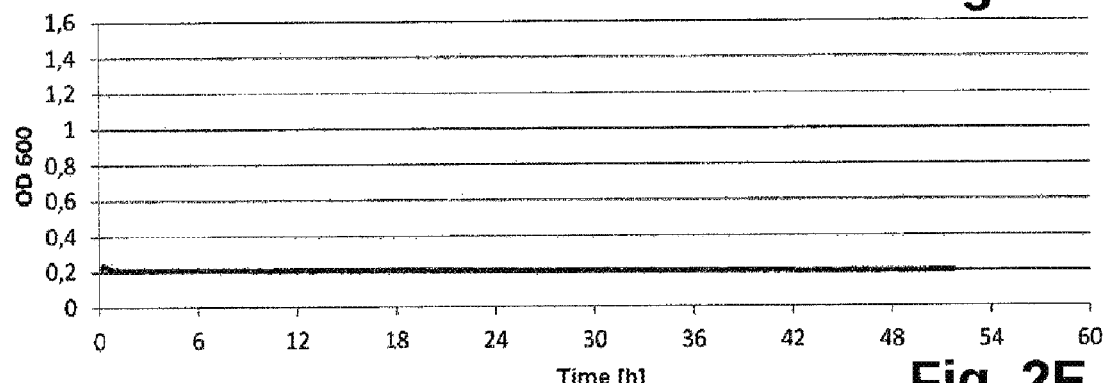
Figure 2F:
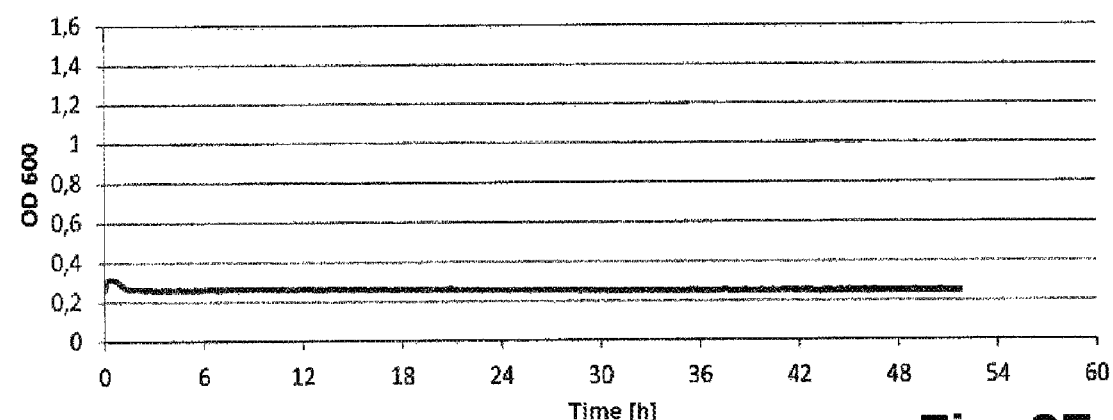
Figure 2G:
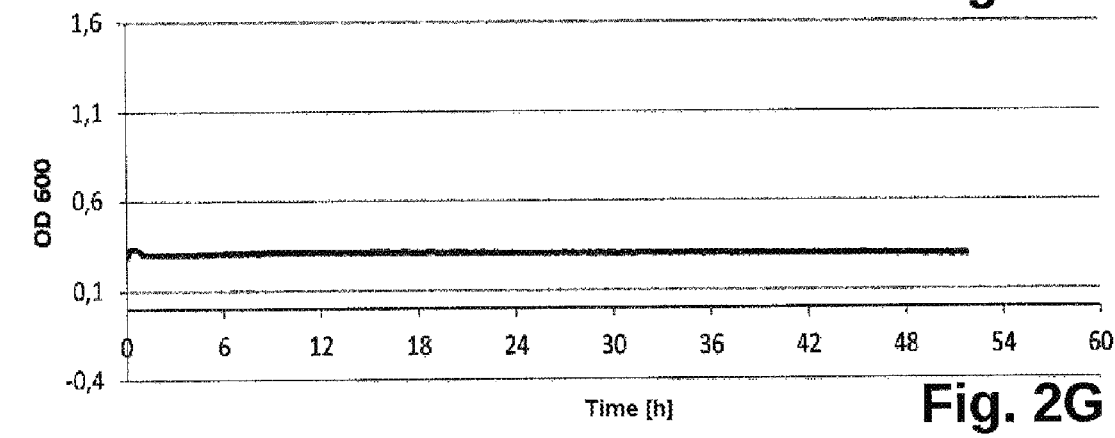
Figure 2H:
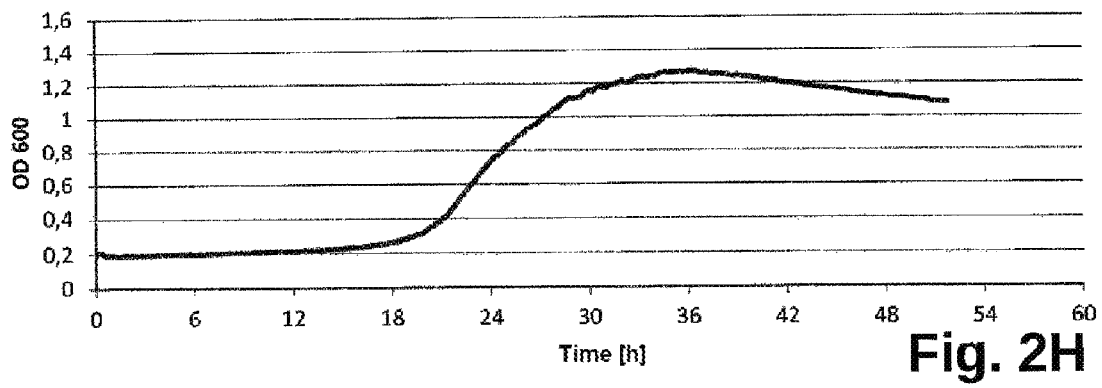
Figure 2I:
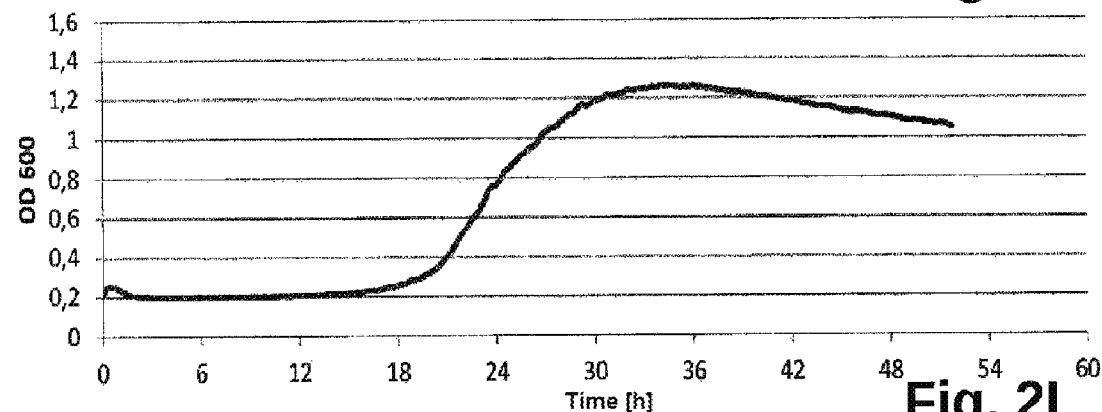
Figure 2J:
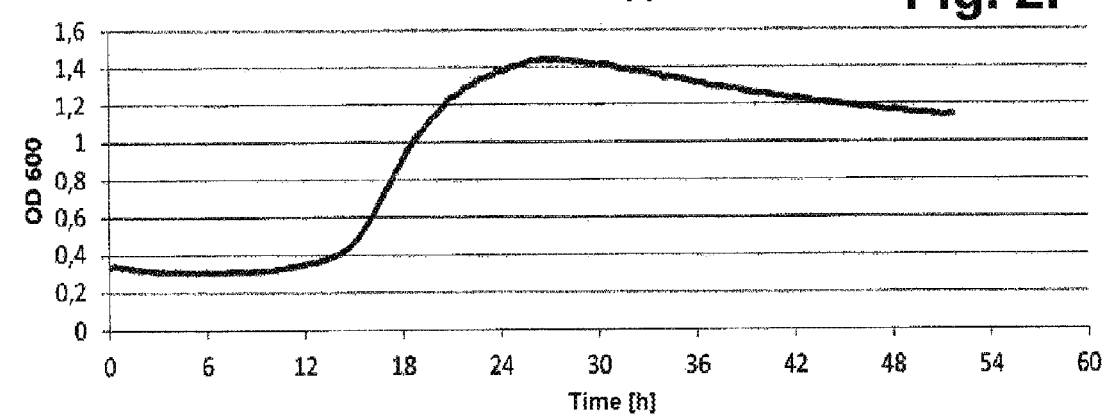
Figure 2K:
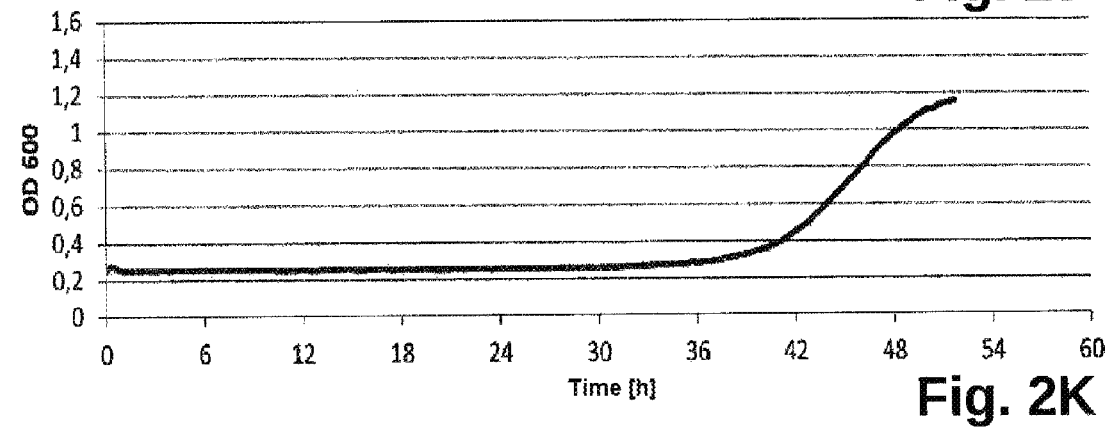
Figure 2L:
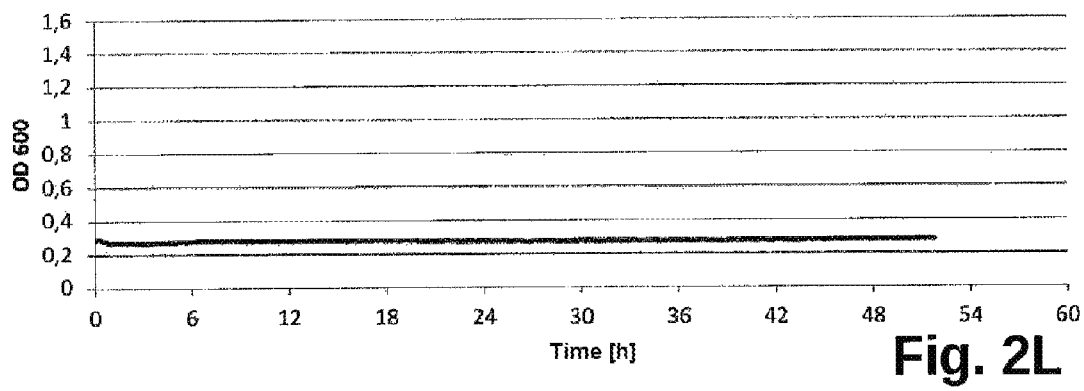
Figure 2M:
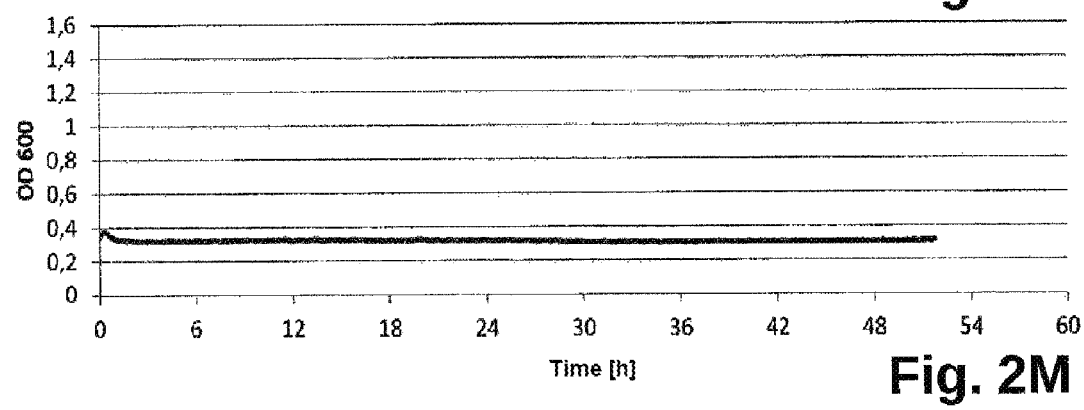
Figure 3A:
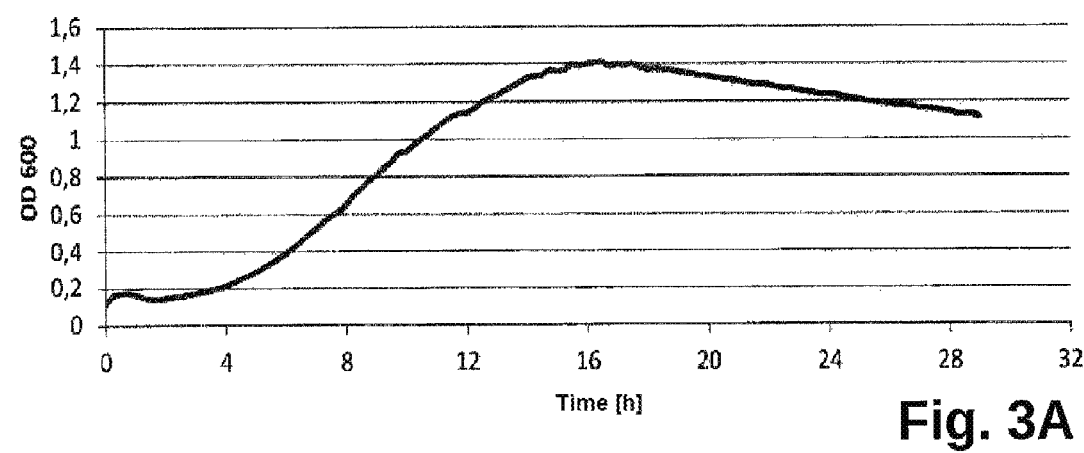
FIGS. 3A-3M: Effect of the biostabilisers on *Halolactibacillus halophilus*. In accordance with example 4, the strain DSM 17073 was exposed to biostabiliser A (hop acid) or to biostabiliser B (resin acid/myristic acid) in various concentrations. Shown is the (A) growth curve without biostabiliser; growth curve at (B) 0.5 ppm, (C) 1 ppm, (D) 10 ppm, (E) 50 ppm, (F) 100 ppm, (G) 250 ppm of biostabiliser A; and growth curve at (H) 0.5 ppm, (I) 1 ppm, (J) 10 ppm, (K)
Figure 3B:
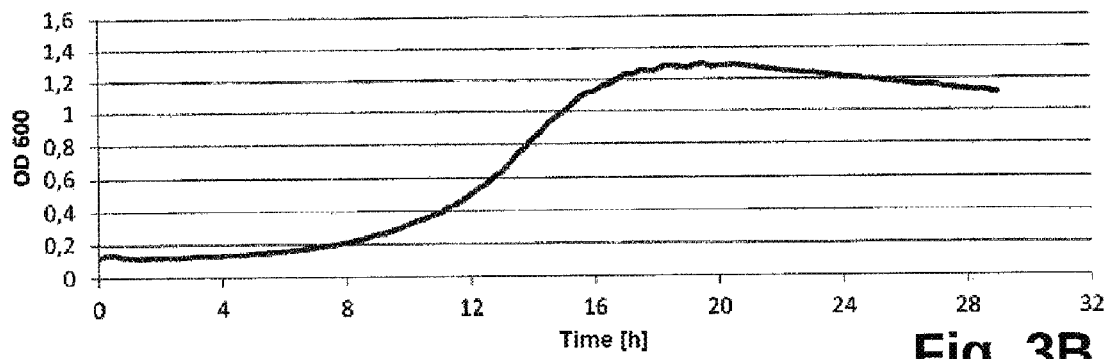
Figure 3C:
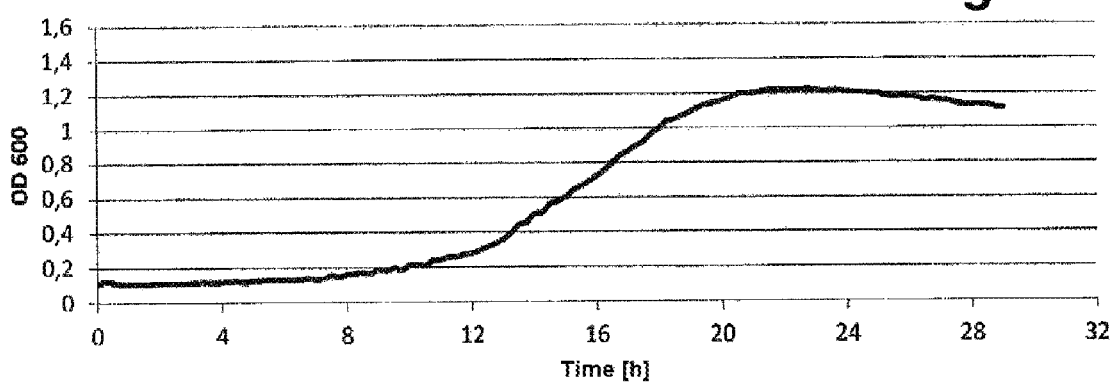
Figure 3D:
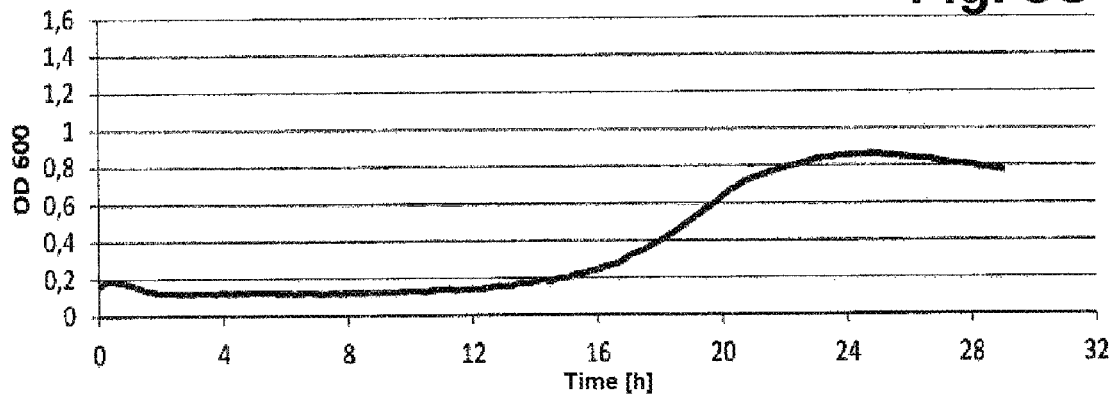
Figure 3E:
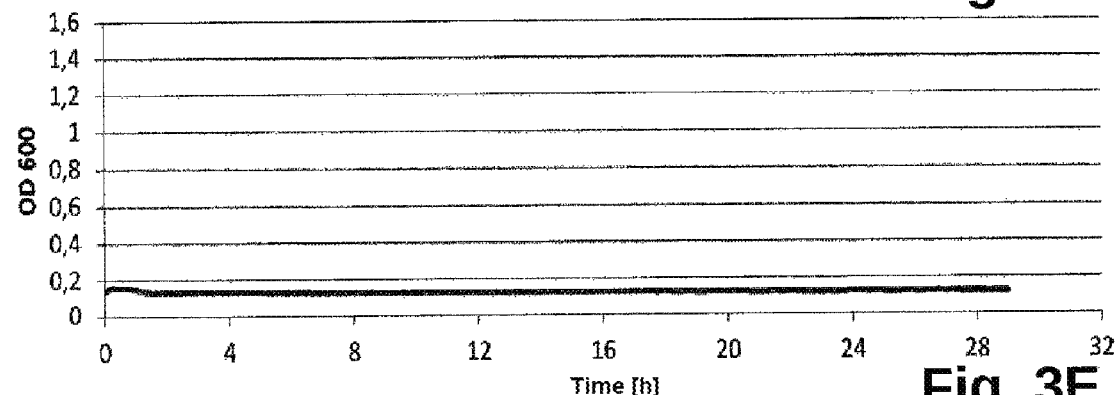
Figure 3F:
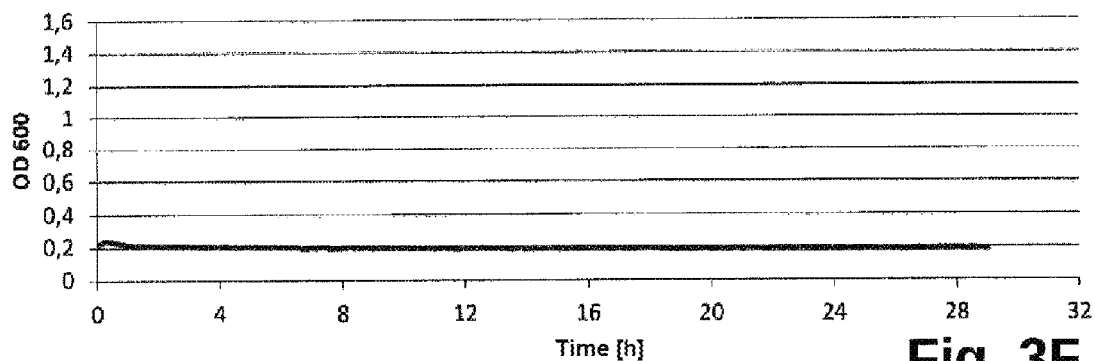
Figure 3G:
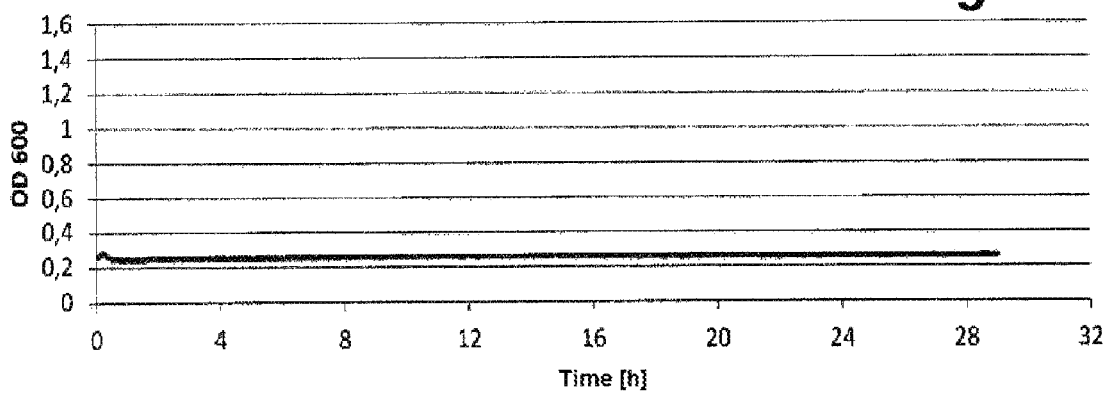
Figure 3H:
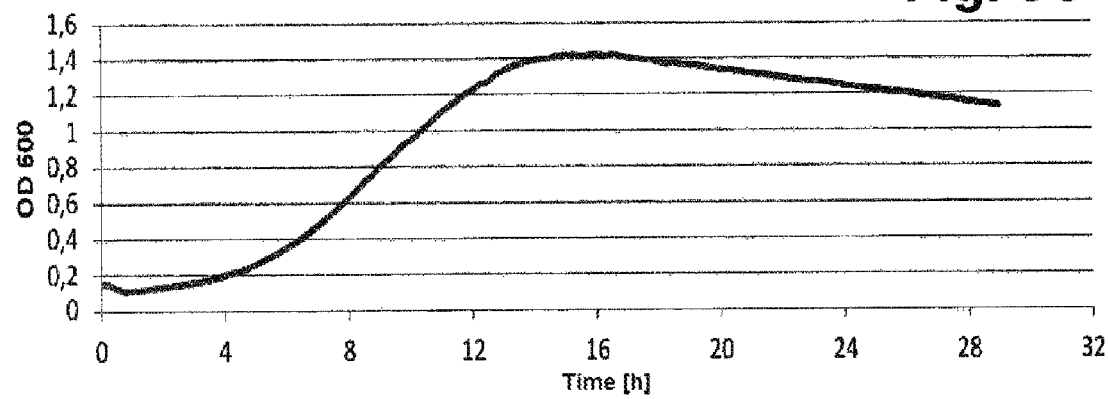
Figure 3I:
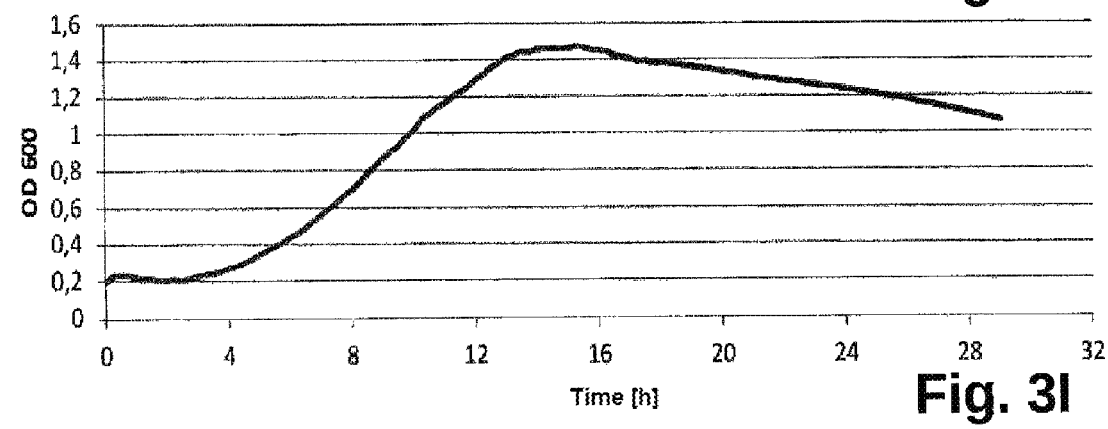
Figure 3J:
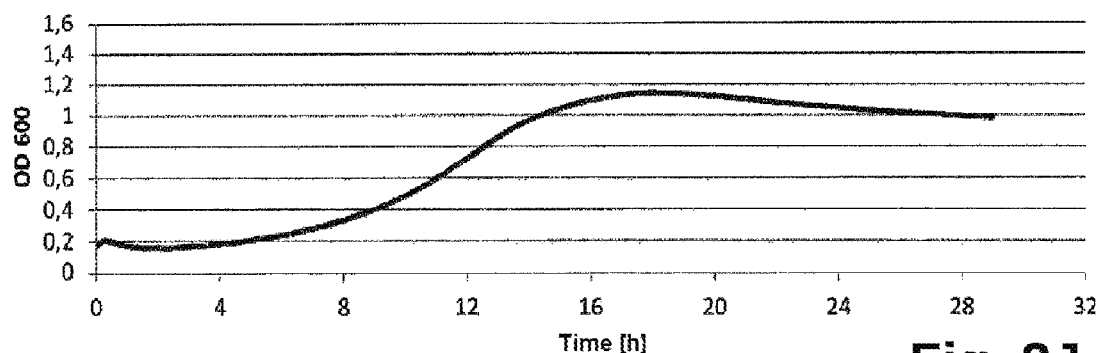
Figure 3K:
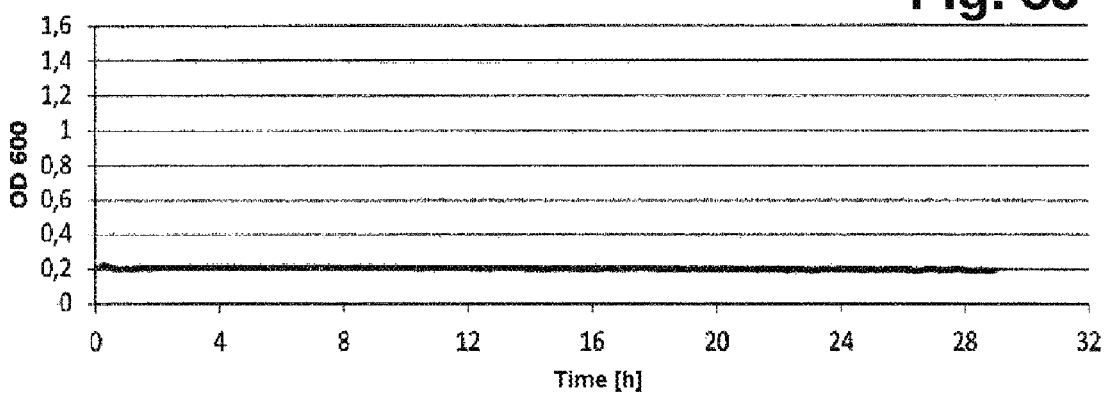
Figure 3L:
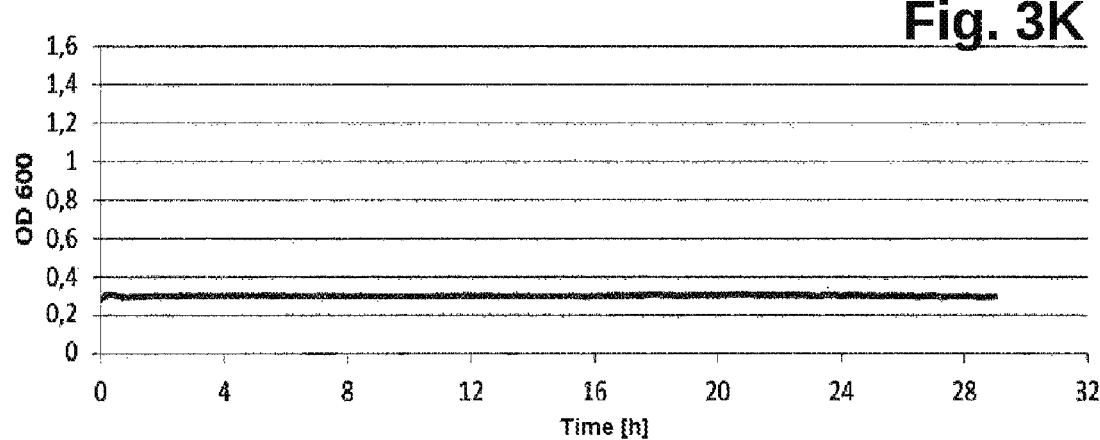
Figure 3M:
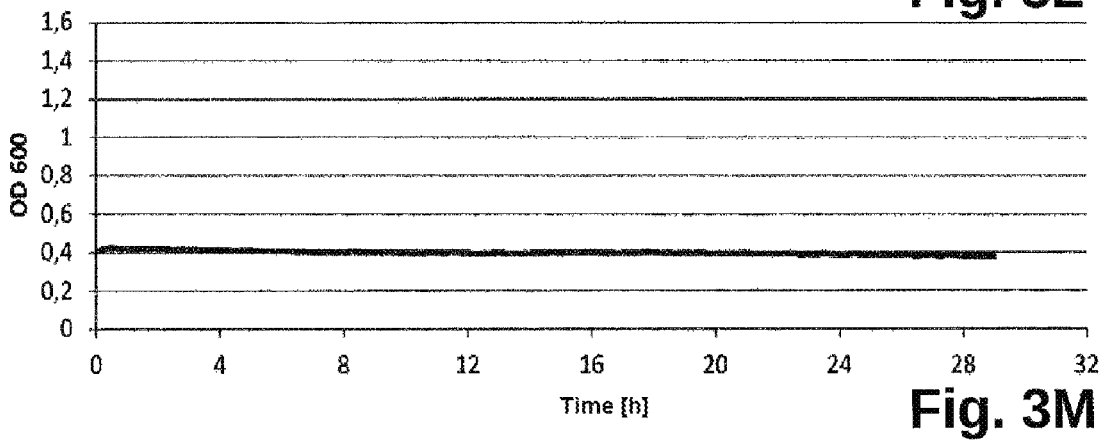
Figure 4A:
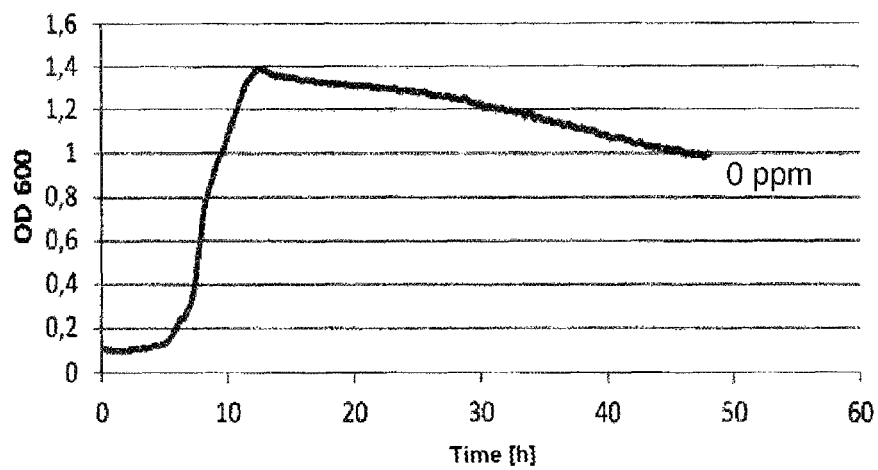
Figure 4B:
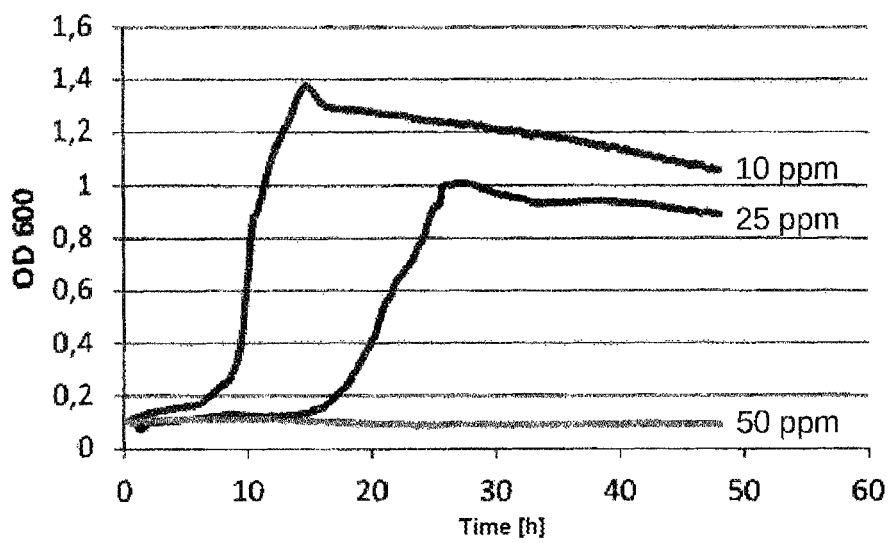
Figure 4C:
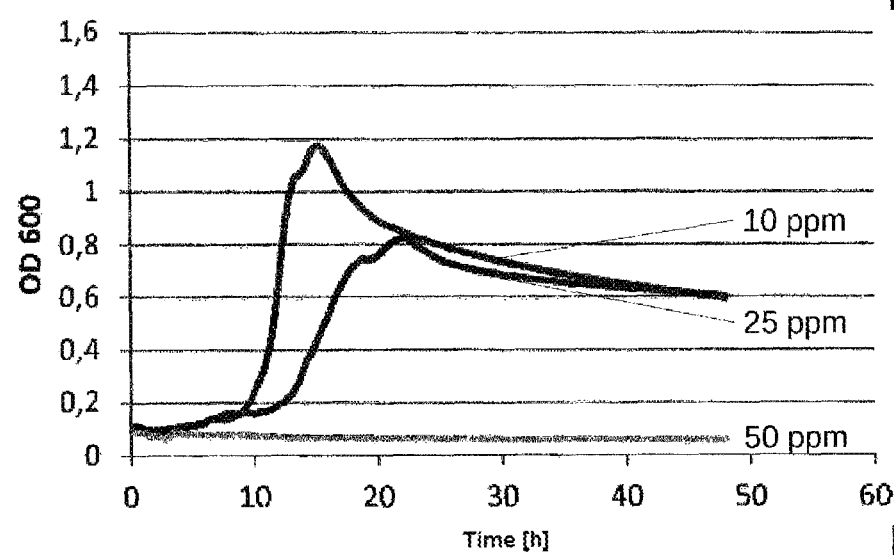

FIGS. 4A-4C: Effect of hop acids compared to the chemical biocide methylenbis[5-methyloxazolidine] on *Halolactibacillus miurensis*. In accordance with example 5, the strain DSM 17074 was exposed to a hop acid containing hop extract or to the biocide 3,3'-methylenbis[5-methyloxazolidine] known in the art in various concentrations. Shown is the (A) growth curve without biostabiliser; (B) growth curves at 10, 25 or 50 ppm methylenbis[5-methyloxazolidine]; (C) growth curves at 10, 25 or 50 ppm hop acids. The dose-dependent tendency towards biostabilisation is clearly evident. Furthermore, it can be seen from the figures that the biostabilising effect of hop acids on *Halolactibacillus miurensis* is surprisingly stronger even at lower concentrations of for example 10 ppm than in the case of the chemical biocide methylenbis [5-methyloxazolidine].

Figure 5A:
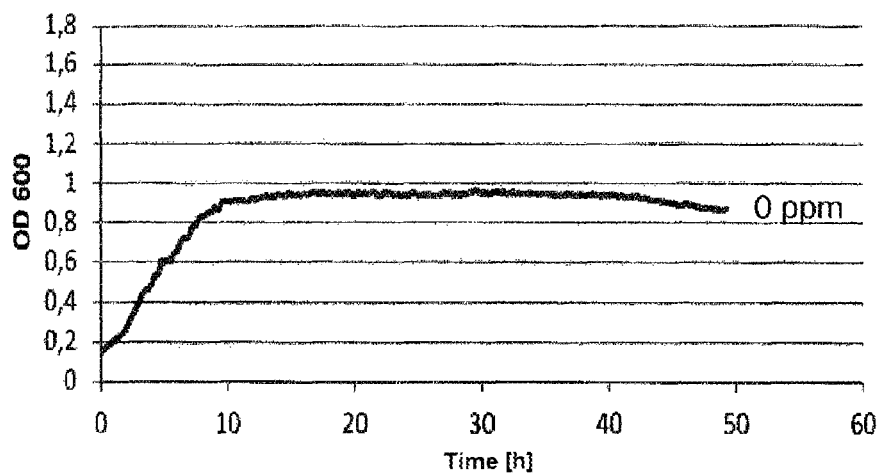
Figure 5B:
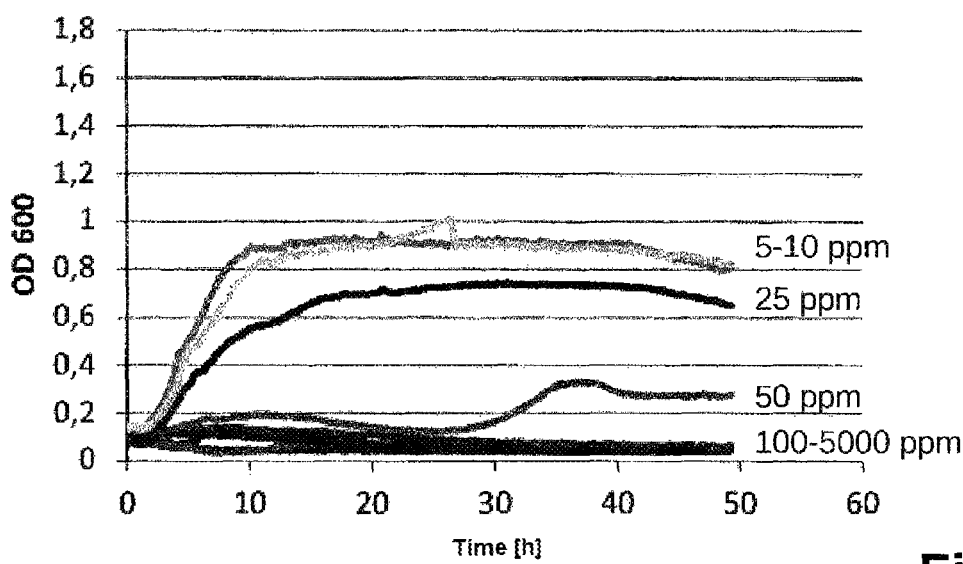
Figure 5C:
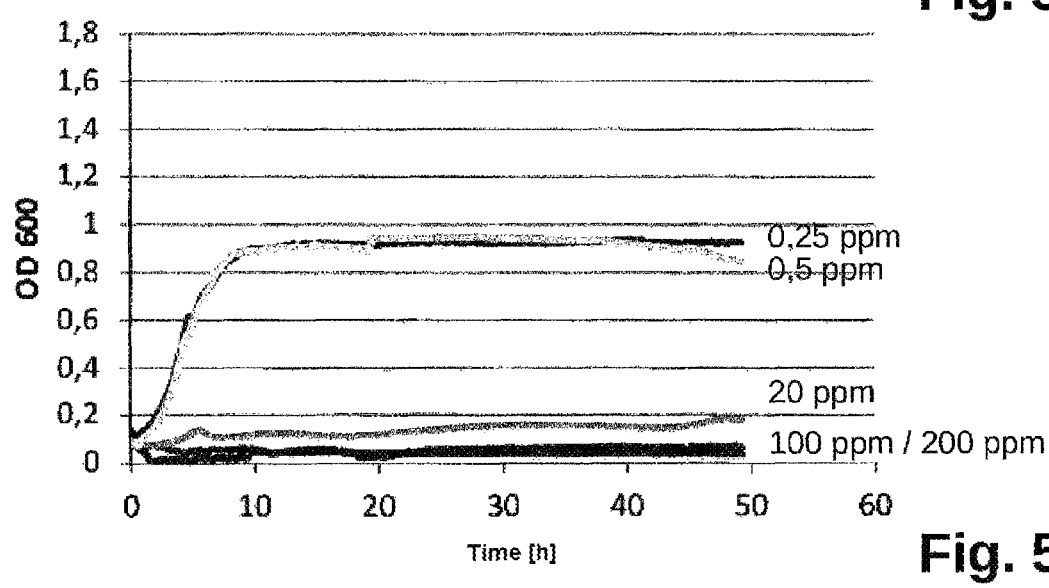

FIGS. 5A-5C: Effect of hop acids compared to the chemical biocide methylenbis[5-methyloxazolidine] on *Halolactibacillus halophilus*. In accordance with example 5, the strain DSM 17074 was exposed to a hop acid containing hop extract or to the biocide 3,3'-methylenbis[5-methyloxazolidine] known in the art in various concentrations. Shown is the (A) growth curve without biostabiliser; (B) growth curves at 5, 10, 25, 50, 100, 200, 1000, 2000 or 5000 ppm methylenbis[5-methyloxazolidine]; (C) growth curves at 0.25, 0.5, 20, 100 or 200 ppm hop acids. The dose-dependent tendency towards biostabilisation is clearly evident. Furthermore, it can be seen from the figures that the biostabilising effect of hop acids on *Halolactibacillus halophilus* is surprisingly stronger even at lower concentrations of for example 20 ppm than in the case of the chemical biocide methylenbis[5-methyloxazolidine] at for example 25 ppm.

EXAMPLES

Example 1A

Preparation of the inventive process fluid as a drilling fluid for a geothermal borehole For a geothermal borehole, 750000 L of process fluid with a biostabiliser were provided as a drilling fluid:

The following substances were added to 720000 L of water: hop acid extract as a biostabiliser (700 kg of a 10% alkaline hop acid solution for a hop acid concentration of 1 g/l). 61000 kg potassium carbonate to inhibit drilled solids; 18000 kg polyanionic cellulose (PAC) and 2250 kg xanthan.

In addition, the following substances were added: 4000 kg of citric acid, 1500 kg of soda, 3000 kg of bentonite and 720 L of defoamer on a fatty alcohol oxylate base.

Example 1B

Inventive use of the process fluid as a drilling fluid in a geothermal borehole

When using a drilling fluid with the biostabiliser of Example 1A at a geothermal borehole in a drilling depth of 750-3200 m, microbiological contamination has been significantly reduced and the adverse effects such as odor, change in viscosity of the drilling fluid or degradation of xanthan can be prevented.

The microbiological tests were carried out on platecount agar by plating 100 µl of a drilling fluid sample and incubating for two days at 37° C. (the microbiological load is indicated in CFU=colony forming units per ml drilling fluid):

Day 1 Start of the second bore section (750 m depth). Drilling fluid of Example 1A, but without biostabiliser and defoamer, was used Day 11 Sampling from drilling fluid—bacterial growth overgrown agar, CFU therefore not well defined but surely far more than 3000. Among other things, a significant proportion of bacteria of the genera *Microbacterium* and *Dietzia* was present in the sample, as determined by sequencing. The drilling fluid of Example 1A with biostabiliser, but without defoamer, was now used. Unexpectedly it was shown that the use of a defoamer was advantageous so that after a short time the drilling fluid of Example 1A (i.e. with biostabiliser and defoamer) was used.

| Day 18 | >300 CFU/ml |
| Day 21 | 93 CFU/ml |
| Day 29 | 13 CFU/ml |
| Day 37 | 14 CFU/ml |
| Day 43 | 19 CFU/ml |
| Day 50 | 18 CFU/ml |
| Day 61 | End of drilling |

Thus, it has surprisingly been found that the process fluid with the biostabiliser according to the invention is also effective as a drilling fluid in a geothermal drilling, particularly against bacteria of the genera *Microbacterium* and *Dietzia*.

Example 2

Biostabilising Effect on *Halanaerobium*

Preparation of the Growth Medium:

Trace element stock solution: Add 1.50 g of nitrilotriacetic acid to 1 L distilled water, adjust pH to 6.5 with KOH. Then add: $MgSO_4 \times 7\ H_2O$ 3 g, $MnSO_4 \times H_2O$ 0.50 g, NaCl 1 g, $FeSO_4 \times 7\ H_2O$ 0.10 g, $CoSO_4 \times 7\ H_2O$ 0.18 g, $CaCl_2 \times 2\ H_2O$ 0.10 g, $ZnSO_4 \times 7\ H_2O$ 0.18 g, $CuSO_4 \times 5\ H_2O$ 0.01 g, $KAl(SO_4)_2 \times 12H_2O$ 0.02 g, $H_3BO_3$ 0.01 g, $Na_2MoO_4 \times 2\ H_2O$ 0.01 g, $NiCl_2 \times 6\ H_2O$ 0.03 g, $Na_2SeO_3 \times 5\ H_2O$ 0.30 mg and $Na_2WO_4 \times 2\ H_2O$ 0.40 mg, adjust pH to 7 with KOH.

Medium basis: Add $NH_4Cl$ 1 g, $K_2HPO_4$ 0.3 g, $KH_2PO_4$ 0.3 g, $MgCl_2 \times 6\ H_2O$ 10 g, $CaCl_2 \times 2\ H_2O$ 0.1 g, KCl 1 g, sodium acetate 0.5 g, cysteine 0.5 g, trypticase 1 g, yeast extract 1 g, NaCl 100 g, trace element stock solution 1 ml and resazurin 0.001 g to 1 L of distilled water.

Boil the medium basis, cool down under $N_2:CO_2$ (80:20 v/v). Aliquot under $N_2:CO_2$ (80:20 v/v) in culture tubes and autoclave. Add to sterile medium basis the following sterile stock solutions up to the concentrations shown in parenthesis: 2% $Na_2S \times 9H_2O$ (0.2 ml/10 ml), 10% $NaHCO_3$ (0.2 ml/10 ml), 1M glucose (0.2 ml/10 ml) and 1M sodium thiosulphate (0.2 ml/10 ml). Optionally adjust pH to 7. Like this, the growth medium is obtained.

*Halanaerobium congolense* (DSM 11287) is obtained from the German Collection of Microorganisms and Cell Cultures (DSMZ). Grow a pre-culture at 42° C. under anaerobic conditions in the growth medium, thereby incubating for 7 days.

Provide 5 culture tubes (R0-R4), each with 2 ml of growth medium, wherein biostabiliser (in the form of hop extract, rosin in sodium salt solution and myristic acid in sodium salt solution) is added to the growth medium in each culture tube up to the following concentrations:

| Tube | Hop Acid [ppm] | Resin Acid [ppm] | Myristic Acid |
|---|---|---|---|
| R0 | 0 | 0 | 0 |
| R1 | 5 | 25 | 25 |
| R2 | 20 | 100 | 100 |
| R3 | 100 | 500 | 500 |
| R4 | 200 | 1000 | 1000 |

Inoculate the tubes with 20 µl of pre-culture each and then determine, after 1, 2, 3 and 4 days of incubation at the growth conditions mentioned above, the optical density (OD). A lower optical density compared to R0 is found, wherein the density difference to R0 increases with higher biostabiliser concentration. In addition, the amount of respectively produced $H_2S$ can be determined.

Example 3

Biostabilising Effect on *Halolactibacillus*
Preparation of the Growth Medium:
Add peptone 5 g, yeast extract 5 g, glucose 10 g, $KH_2PO_4$ 1 g, $MgSO_4 \times 7\ H_2O$ 0.2 g, NaCl 40 g, $Na_2CO_3$ 10 g to 1 L of distilled water. Optionally adjust pH to 9.6.

*Halolactibacillus halophilus* (DSM 17073) is obtained from the German Collection of Microorganisms and Cell Cultures (DSMZ). Grow a pre-culture at 30° C. in the growth medium, thereby incubating for 3 days.

Provide 5 culture tubes (R0-R4), each with 2 ml of growth medium, wherein biostabiliser (in the form of hop extract, rosin in sodium salt solution and myristic acid in sodium salt solution) is added to the growth medium in each culture tube up to the following concentrations:

| Tube | Hop Acid [ppm] | Resin Acid [ppm] | Myristic Acid |
|---|---|---|---|
| R0 | 0 | 0 | 0 |
| R1 | 5 | 25 | 25 |
| R2 | 20 | 100 | 100 |
| R3 | 100 | 500 | 500 |
| R4 | 200 | 1000 | 1000 |

Inoculate the tubes with 20 µl of pre-culture each and then determine, after 1, 2, 3 and 4 days of incubation at the growth conditions mentioned above, the optical density. A lower optical density compared to R0 is found, wherein the density difference to R0 increases with higher biostabiliser concentration.

Example 4

Biostabilising Effect on *Halanaerobium* and *Halolactibacillus*

The effect of selected biostabilisers (hop beta acids or resin acids/myristic acid, biostabiliser A or B) on the growth of three defined bacterial strains (*Halanaerobium congolense* DSM 11287, *Halolactibacillus halophilus* DSM 17073, *Halolactibacillus miurensis* DSM 17074) was analyzed by an in vitro experiment.

The following aqueous stock solutions for the selected biostabilisers were used: (A) 10% alkaline beta hop acid solution (hop extract) and (B) 20% alkaline solution of resin acids (rosin) and myristic acid (60:40).

TABLE 1

| Culturing Conditions | | |
|---|---|---|
| Strain | Culture medium | Environmental conditions |
| *Halanaerobium congolense* DSM 11287 | DSMZ Medium No. 933 (as in Example 2) | 3 days, anaerobic, 42° C. |
| *Halolactibacillus miurensis* DSM 17074 | DSMZ Medium No. 785 (as in Example 3) | 48 h, microaerophilic, 30° C. |
| *Halolactibacillus halophilus* DSM 17073 | DSMZ Medium No. 785 (as in Example 3) | 48 h, microaerophilic, 30° C. |

Each of the three test strains was grown for several days before the biostabilising experiments according to table 1. The species identity was checked by sequencing and again by a sequence comparison in public data bases.

The biostabilising experiments were carried out with the Bioscreen instrument. It involves a special microtiter plate photometer which simultaneously serves as an incubator and can accommodate up to two so-called Honeycomb microtiter plates with 100 wells simultaneously. The determination of the growth is carried out by an OD measurement at 600 nm. During the incubation the Honeycomb microtiter plates were shaken every 15 sec before each measurement with medium strength for 5 sec. The OD measurement was carried out every 15 min.

In each of the tests carried out two Honeycomb microtiter plates per test strain were used which were each filled according to the same scheme. On the respectively first microtiter plate, the biostabiliser A was tested and on the respectively second plate, the biostabiliser B was tested at concentrations of 0.5 ppm, 1 ppm, 10 ppm, 50 ppm, 100 ppm, and 250 ppm. The concentration data in ppm in this example refer to the final concentration of hop acids in the growth medium (for A) and to the final concentration of resin acids/myristic acid in the growth medium (in the composition 60:40, for B). "ppm" in this example stands for mg of organic acids (i.e. hop acids or resin acids/myristic acid) per kg of solution (i.e. growth medium+additives).

All test strains were tested sevenfold (i.e. n=7) at each listed biostabiliser concentration. To this purpose, the respective biostabiliser concentrations were investigated in parallel with each bacterial strain in seven wells of the Honeycomb microtiter plate. In addition, three wells per biostabiliser concentration were included as control means, i.e. instead of the bacterial suspension, sterile water was pipetted into the wells. In addition, seven wells were carried out without biostabiliser on each plate for further control to detect the typical growth of each strain under the chosen test conditions. Sterility control included three additional wells each per biostabiliser and bacterial strain (medium without biostabiliser and without bacterial suspension).

In each well, the respective growth medium according to table 1, bacterial suspension (or sterile water at the appropriate controls) and the biostabiliser solution were pipetted at the appropriate concentration. To create a strictly anaerobic atmosphere for *Halanaerobium congolense*, the growth medium was mixed with oxyrase (oxygen removing enzyme). By mixing all of the components, the respectively desired biostabiliser concentrations were achieved. Subsequently, all wells were overlaid with 2-3 drops of sterile paraffin oil. This served to maintain the anaerobic conditions for *Halanaerobium congolense* and to create microaerophilic conditions for *Halolactibacillus miurensis* and *Halolactibacillus halophilus*.

Composition of each volume in the wells of the microtiter plate (for *Halanaerobium congolense*)
  300 µl 1.25×growth medium (DSMZ No. 933)
  50 µl bacterial suspension
  10 µl Oxyrase® (Oxyrase Inc., Ohio, USA)
  10 µl biostabiliser solution at an appropriate concentration
  2-3 drops of paraffin for overcoating Composition of each volume in the wells of the microtiter plate (for the other three strains)
  300 µl 1.25×growth medium (DSMZ No. 785 or CASO)
  50 µl bacterial suspension
  10 µl biostabiliser solution at an appropriate concentration
  2-3 drops of paraffin for overcoating The respective growth curves are shown in the figures and show a strong concentration-dependent influence on the growth of the test strains by the biostabilisers. At higher concentrations of the biostabilisers it comes to an opacification of the growth medium (i.e. higher initial OD value—for an assessment of the biostabilising effect, it is not the initial OD value which is relevant, but the course of the growth curve or the OD gain)—and occasionally to aberrations (because the biostabiliser occasionally precipitates out of solution), yet the dose-dependent tendency towards biostabilisation is clearly evident from the figures.

In most tested biostabiliser/test strain combinations, a concentration of 0.5 ppm is already causing an influence on the growth (lower OD gain or delayed reaching the maximum OD). A complete inhibition of growth (i.e. no OD enhancing growth occurs any more) appeared strain-individually mostly at 10 ppm or 50 ppm of biostabiliser concentration (see Table 2).

Under the test conditions, the biostabilisers A and B were able to inhibit the growth of the tested bacteria, i.e. to act biostabilising.

TABLE 2

Minimum biostabiliser concentration for total growth inhibition. A: hop acids, B: resin acids/myristic acid (60:40)

| Strain | Biostabiliser A [ppm] | Biostabiliser B [ppm] |
|---|---|---|
| *Halanaerobium congolense* DSM 11287 | 10 | 100 |
| *Halolactibacillus miurensis* DSM 17074 | 50 | 10 |
| *Halolactibacillus halophilus* DSM 17073 | 1 | 250 |

Example 5

Comparative Example

The biostabilising effect of hop acids compared to the chemical biocide methylenbis[5-methyloxazolidine] known in the art and used in a large technical scale, on *Halolactibacillus*. This test was operated essentially in accordance with example 4 (except in respect of the biostabilisers and the concentrations of them). The results of these investigations are shown in FIGS. 4A-4C and 5A-5C. The dose-dependent tendency towards biostabilisation by hop acids is clearly evident. Furthermore it has surprisingly been shown during the investigations that the biostabilising effect of hop acids on *Halolactibacillus* is stronger even at lower concentrations than in the case of the chemical biocide methylenbis[5-methyloxazolidine] (see FIGS. 4B-4C and 5B-5C).

CITED NON-PATENT-LITERATURE

Ashraf et al. "Green biocides, a promising technology: current and future applications to industry and, industrial processes." *Journal of the Science of Food and Agriculture* 94.3 (2014): 388-403

Emerstorfer, Kneifel and Hein, "The role of plant-based antimicrobials in food and feed production with special regard to silage fermentation", *Die Bodenkultur—Journal for Land Management, Food and Environment* (2009), vol. 60, issue 3

Jorgensen and Ferraro, "Antimicrobial susceptibility testing: general principles and contemporaryPractices", *Clinical Infectious Diseases* 26, 973-980 (1998).

Madigan et al. "Brock Biology of Microorganisms", 10. Aus-gabe (2003), insbesondere S. 138

Ullmann's Encyclopedia of Industrial Chemistry, Vol. A 23 (1993), S. 73-88.

Wang, Jifu, et al. "Robust antimicrobial compounds and polymers derived from natural resin acids." *Chemical Communications* 48.6 (2012): 916-918.

White, et al. "Antimicrobial resistance: standardisation and harmonisation of laboratory methodologies for the detection and quantification of antimicrobial resistance" *Rev. sci. tech. Off. int. Epiz.* 20 (3), 849-858 (2001).

The invention claimed is:

1. A process fluid for a geothermal borehole comprising:
an environmentally compatible biostabiliser adapted for use in the process fluid to reduce microorganisms within the geothermal borehole, the biostabiliser comprising at least one resin acid;
wherein the process fluid further comprises clay minerals, water, and a defoamer;
wherein the defoamer comprises a fatty alcohol alkoxylate or an alkylene oxide polymer;
wherein the process fluid is at most 20° dH (German Hardness), and the biostabiliser is dissolved in the process fluid; and
wherein a volume of the process fluid is at least $10^4$ L.

2. The process fluid of claim 1, further comprising a gelling agent.

3. The process fluid of claim 2, wherein the gelling agent is a biopolymer.

4. The process fluid of claim 1, wherein the total concentration of resin acids in the process fluid is 0.05-5000 ppm.

5. The process fluid of claim 1, wherein the process fluid is at most 15° dH (German Hardness).

6. The process fluid of claim 1, wherein the process fluid is at most 10° dH (German Hardness).

7. The process fluid of claim 1, wherein the process fluid is at most 7.5° dH (German Hardness).

8. The process fluid of claim 1, wherein the process fluid is at most 5° dH (German Hardness).

9. The process fluid of claim 1, wherein the process fluid further comprises a water softener.

10. The process fluid of claim 9, wherein the water softener is a cation exchanger.

11. A process for preparation of a process fluid for a geothermal borehole, the process fluid comprising:
an environmentally compatible biostabliser adapted for use in the process fluid to reduce microorganisms within the geothermal borehole, the biostabiliser comprising at least one resin acid;

wherein the process fluid further comprises clay minerals, water, and a defoamer comprising a fatty alcohol alkoxylate or an alkylene oxide polymer;

wherein the process fluid is at most 20° dH (German Hardness), and the biostabiliser is dissolved in the process fluid;

the process comprising adding resin acids to water or a water-containing portion of the process fliud; and the process further comprising adding clay minerals and the defoamer to obtain the process fluid.

12. The process for preparation of the process fluid of claim 11, further comprising adding gelling agent to the process fluid prior to adding the clay minerals and the defoamer.

13. The process for preparation of the process fluid of claim 12, wherein the gelling agent is a biopolymer.

14. The process for preparation of the process fluid of claim 11, wherein a total concentration of resin acids in the resulting process fluid is 0.05-5000 ppm.

15. The process for preparation of the process fluid of claim 11, wherein the process fluid is at most 15° dH (German Hardness).

16. The process for preparation of the process fluid of claim 11, wherein the process fluid is at most 10° dH (German Hardness).

17. The process for preparatin of the process fluid of claim 11, wherein the process fluid is at most 7.5° dH (German Hardness).

18. The process for preparation of the process fluid of claim 11, wherein the process fluid is at most 5° dH (German Hardness).

19. The process for preparation of the process fluid of claim 11, wherein the process fluid further comprises a water softener.

20. A process fluid for a geothermal borehole comprising:
an environmentally compatible biostabiliser adapted for use in the process fluid to reduce microorganisms within the geothermal borehole, the biostabiliser comprising at least one resin acid;

wherein the process fluid further comprises clay minerals, water, a defoamer, and a water softener;

wherein the process fluid is at most 20° dH (German Hardness), and the biostabiliser is dissolved in the process fluid; and wherein a volume of the proceess fluid is at least $10^4$ L.

21. A process for preparation of a process fluid for a geothermal borehole, the process fluid comprising:
an environmentally compatible biostabiliser adapted for use in the process fluid to reduce microorganisms within the geothermal borehole, the biostabiliser comprising at least one resin acid;

wherein the process fluid further comprises clay minerals, water, a defoamer, and a water softener;

wherein the process fluid is at most 20° dH (German Hardness), and the biostabiliser is dissolved in the process fluid;

the process comprising adding resin acids to water or a water-containing portion of the process fluid; and the process further comprising adding clay minerals and the defoamer to obtain the process fluid.

* * * * *